US010571775B2

(12) United States Patent
Mori

(10) Patent No.: US 10,571,775 B2
(45) Date of Patent: Feb. 25, 2020

(54) OPTICAL TRANSMISSION APPARATUS, OPTICAL TRANSMISSION SYSTEM, AND METHOD OF CONTROLLING EXCITATION LIGHT FREQUENCY

(71) Applicant: FUJITSU LIMITED, Kawasaki-shi, Kanagawa (JP)

(72) Inventor: Shota Mori, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/570,340

(22) Filed: Sep. 13, 2019

(65) Prior Publication Data

US 2020/0004107 A1 Jan. 2, 2020

Related U.S. Application Data

(62) Division of application No. 16/181,752, filed on Nov. 6, 2018, now Pat. No. 10,451,955.

(30) Foreign Application Priority Data

Nov. 16, 2017 (JP) ................................ 2017-220987

(51) Int. Cl.
*G02F 2/00* (2006.01)
*H04J 14/02* (2006.01)
*G02F 1/35* (2006.01)

(52) U.S. Cl.
CPC ............ *G02F 2/004* (2013.01); *G02F 1/3536* (2013.01); *H04J 14/02* (2013.01); *G02F 2002/008* (2013.01)

(58) Field of Classification Search
CPC .. G02F 2/004; G02F 1/3536; G02F 2002/008; H04J 14/02
See application file for complete search history.

(56) References Cited

U.S. PATENT DOCUMENTS 5,552,926 A 9/1996 Owa et al.
7,242,700 B2 7/2007 Wang
(Continued)

FOREIGN PATENT DOCUMENTS

JP H11-312839 A 11/1999
JP 2000-75330 A 3/2000
JP 2005-286151 A 10/2005

OTHER PUBLICATIONS

USPTO, (Petkovsek) Notice of Allowance & Notice of Allowability, dated Jun. 19, 2019 in U.S. Appl. No. 16/181,752 [pending].
(Continued)

*Primary Examiner* — Daniel Petkovsek
(74) *Attorney, Agent, or Firm* — Fujitsu Patent Center

(57) ABSTRACT

An optical transmission apparatus includes a wavelength converter that wavelength-converts input signal light using a nonlinear optical medium to output the converted signal light, a memory that holds first information relating to a wavelength conversion characteristic of the wavelength converter, a communication interface that receives second information relating to a second wavelength conversion characteristic of an adjacent optical transmission apparatus, and a control circuit that determines, using the first information and the second information when the second information is received, an excitation light frequency at which a gain deviation of main signal light subjected to a wavelength conversion is minimized to set the determined excitation light frequency in the wavelength converter.

6 Claims, 26 Drawing Sheets

[νp1 TO νp4 : EXCITATION LIGHT FREQUENCY]

(56) References Cited

U.S. PATENT DOCUMENTS

| | | | | |
|---|---|---|---|---|
| 7,729,397 | B1 | 6/2010 | Gollier et al. | |
| 7,912,373 | B2 * | 3/2011 | Yajima ................ | H04J 14/0212 398/45 |
| 10,139,702 | B2 | 11/2018 | Bhandari et al. | |
| 2005/0099674 | A1 | 5/2005 | Watanabe | |
| 2005/0219682 | A1 | 10/2005 | Natori et al. | |
| 2017/0237499 | A1 | 8/2017 | Nishita et al. | |
| 2017/0264371 | A1 | 9/2017 | Fukui et al. | |

OTHER PUBLICATIONS

USPTO, (Petkovsek) Requirement for Restriction/Election, dated Mar. 4, 2019 in U.S. Appl. No. 16/181,752 [pending].

* cited by examiner

[νp1 TO νp4 : EXCITATION LIGHT FREQUENCY , νz1 TO νz4 : ZERO DISPERSION FREQUENCY]

APPROXIMATE AS QUADRATIC FUNCTION BY LEAST SQUARES METHOD : $y = ax^2 + bx + C$ (y: AMOUNT OF GENERATED TILT
x: EXCITATION LIGHT FREQUENCY)

| EXCITATION LIGHT FREQUENCY | AMOUNT OF TILT OF HNLF1 | AMOUNT OF TILT OF HNLF4 |
|---|---|---|
| 191.240 | 20.5 | 18.3 |
| 191.250 | 14.2 | 11.6 |
| ⋮ | ⋮ | ⋮ |
| 191.290 | 0.8 | 0.2 |
| 191.300 | 0.6 | 0.0 |
| 191.310 | 0.2 | 0.4 |
| ⋮ | ⋮ | ⋮ |
| 191.350 | 7.7 | 13.2 |
| 191.360 | 12.5 | 19.6 |

FIG. 17

| EXCITATION LIGHT FREQUENCY | RECEIVED VALUE OF AMOUNT OF TILT OF HNLF1 | HOLDING VALUE OF AMOUNT OF TILT OF HNLF2 | TOTAL AMOUNT OF TILT |
|---|---|---|---|
| 191.240 | 20.5 | 16.5 | 37.0 |
| 191.250 | 14.2 | 12.2 | 26.4 |
| ⋮ | ⋮ | ⋮ | ⋮ |
| 191.290 | 0.8 | 0.4 | 1.2 |
| 191.300 | 0.3 | 0.0 | 0.3 |
| 191.310 | 0.2 | 0.3 | 0.5 |
| ⋮ | ⋮ | ⋮ | ⋮ |
| 191.350 | 7.7 | 14.3 | 22.0 |
| 191.360 | 12.5 | 21.5 | 33.6 |

SELECTION

FIG. 22

| TOTAL AMOUNT OF TILT | EXCITATION LIGHT FREQUENCY ON RECEPTION SIDE | | | | | | | | | | | | | AMOUNT OF TILT ON RECEPTION SIDE |
|---|---|---|---|---|---|---|---|---|---|---|---|---|---|---|
| EXCITATION LIGHT FREQUENCY ON TRANSMISSION SIDE | 191.24 | 191.25 | 191.26 | 191.27 | 191.28 | 191.29 | 191.30 | 191.31 | 191.32 | 191.33 | 191.34 | 191.35 | 191.36 | |
| 191.24 | 36.7 | 33.4 | 30.7 | 28.8 | 27.1 | 26.2 | 25.9 | 26.2 | 27.1 | 28.6 | 30.7 | 33.4 | 36.7 | 25.8 |
| 191.25 | 30.7 | 27.4 | 24.7 | 22.6 | 21.1 | 20.2 | 19.9 | 20.2 | 21.1 | 22.6 | 24.7 | 27.4 | 30.7 | 19.8 |
| 191.26 | 25.5 | 22.2 | 19.5 | 17.4 | 15.9 | 15 | 14.7 | 15 | 15.9 | 17.4 | 19.5 | 22.2 | 25.5 | 14.6 |
| 191.27 | 21.1 | 17.8 | 15.1 | 13 | 11.5 | 10.6 | 10.3 | 10.6 | 11.5 | 13 | 15.1 | 17.8 | 21.1 | 10.2 |
| 191.28 | 17.5 | 14.2 | 11.5 | 9.4 | 7.9 | 7 | 6.7 | 7 | 7.9 | 9.4 | 11.5 | 14.2 | 17.5 | 6.6 |
| 191.29 | 14.7 | 11.4 | 8.7 | 6.6 | 5.1 | 4.2 | 3.9 | 4.2 | 5.1 | 6.6 | 8.7 | 11.4 | 14.7 | 3.8 |
| 191.30 | 12.7 | 9.4 | 6.7 | 4.6 | 3.1 | 2.2 | 1.9 | 2.2 | 3.1 | 4.6 | 6.7 | 9.4 | 12.7 | 1.8 |
| 191.31 | 11.5 | 8.2 | 5.5 | 3.4 | 1.9 | 1 | 0.7 | 1 | 1.9 | 3.4 | 5.5 | 8.2 | 11.5 | 0.6 |
| 191.32 | 11.1 | 7.8 | 5.1 | 3 | 1.5 | 0.6 | 0.3 | 0.6 | 1.5 | 3 | 5.1 | 7.8 | 11.1 | 0.2 |
| 191.33 | 11.5 | 8.2 | 5.5 | 3.4 | 1.9 | 1 | 0.7 | 1 | 1.9 | 3.4 | 5.5 | 8.2 | 11.5 | 0.6 |
| 191.34 | 12.7 | 9.4 | 6.7 | 4.6 | 3.1 | 2.2 | 1.9 | 2.2 | 3.1 | 4.6 | 6.7 | 9.4 | 12.7 | 1.8 |
| 191.35 | 14.7 | 11.4 | 8.7 | 6.6 | 5.1 | 4.2 | 3.9 | 4.2 | 5.1 | 6.6 | 8.7 | 11.4 | 14.7 | 3.8 |
| 191.36 | 17.5 | 14.2 | 11.5 | 9.4 | 7.9 | 7 | 6.7 | 7 | 7.9 | 9.4 | 11.5 | 14.2 | 17.5 | 6.6 |
| AMOUNT OF TILT ON TRANSMISSION SIDE | 10.9 | 7.6 | 4.9 | 2.8 | 1.3 | 0.4 | 0.1 | 0.4 | 1.3 | 2.8 | 4.9 | 7.6 | 10.9 | |

OPTICAL TRANSMISSION APPARATUS, OPTICAL TRANSMISSION SYSTEM, AND METHOD OF CONTROLLING EXCITATION LIGHT FREQUENCY

CROSS-REFERENCE TO RELATED APPLICATION

This application is a divisional of application Ser. No. 16/181,752, filed Nov. 6, 2018, which is based upon and claims the benefit of priority of the prior Japanese Patent Application No. 2017-220987, filed on Nov. 16, 2017, the entire contents of which are incorporated herein by reference.

FIELD

The embodiments discussed herein are related to an optical transmission apparatus having a wavelength conversion function, an optical transmission system, and a method of controlling an excitation light frequency.

BACKGROUND

In order to cope with an increase in demand for communication lines, the wavelength multiplexing number is increased in the wavelength division multiplexing (WDM), and the transmission rate per wavelength is increased in the digital coherent technology. In the wavelength band, the 1.55 μm band (C band) matching the amplification wavelength band of an erbium-doped fiber amplifier (EDFA) is most widely used. A technique using a signal in the 1.59 μm band (L band) by shifting the amplification band of the EDFA to the long wavelength side has also been put to practical use. As a method of further expanding the wavelength band, research and development of optical amplifiers and so forth for use in the 1.46 to 1.53 μm band (S band) is also conducted although such optical amplifiers have not yet been put into practical use.

On the other hand, technology for converting the signal light wavelength by using the four wave mixing (FWM) effect in the optical fiber has been studied and developed for about 20 years. The FWM is a phenomenon in which a new wavelength which does not coincide with any of the incident wavelengths occurs when light of two or more different wavelengths is incident on a highly nonlinear fiber (HNLF). Wavelength conversion techniques using a phase conjugate and the FWM of a nonlinear optical crystal have also been offered. For nonlinear optical media such as nonlinear optical crystals and the HNLF, there is a wavelength at which chromatic dispersion is zero. When the excitation light wavelength coincides with the zero dispersion wavelength, a broadband wavelength conversion is possible.

In a wavelength conversion using the FWM or the phase conjugation, it is possible to collectively convert WDM signals, but there are factors that limit the wavelength band. When the zero dispersion wavelength and the excitation light wavelength do not coincide with each other, the conversion efficiency of the main signal decreases at a wavelength away from that of the excitation light, and a Gain deviation or a tilt occurs. In the following description, both the term "wavelength" and the term "frequency" are used. Since the wavelength and the frequency are in reciprocal relation, the two has practically the same meaning.

FIGS. 1A to 1C illustrate the tilt generated in the main signal light when the zero dispersion frequency and the excitation light frequency do not coincide with each other.

FIG. 1A illustrates a simulation of conversion efficiency when the zero dispersion frequency of an HNLF is deviated to the minus side from the excitation light frequency. FIG. 1B illustrates a simulation of the conversion efficiency when the zero dispersion frequency of HNLF is deviated to the plus side from the excitation light frequency. When the frequency deviation is 0 GHz (solid line), a flat conversion characteristic may be obtained over a wide band. As the frequency deviation increases, the signal light whose frequency is away from the excitation light frequency has a low conversion efficiency, and a gain deviation or a tilt occurs. FIG. 1C is a diagram illustrating the amount of degradation of the conversion efficiency of the outermost channel as a function of the frequency deviation. As the frequency deviation increases, signal efficiency deteriorates remarkably on both plus and minus sides.

FIG. 2 is a diagram for explaining the influence of a tilt which occurs in a wavelength conversion. When performing wavelength conversions twice, for example, when converting C band to L band on the transmission side, and then converting the L band to the C band on the reception side, the tilt accumulates, whereby the signal wavelength away from the wavelength of the excitation light is disadvantageous. When the wavelength conversion at a fixed excitation light wavelength is performed by a wavelength converter using a nonlinear optical medium, a tilt occurs in the conversion light as illustrated in FIG. 2. When the excitation light wavelength is controlled to match with the zero dispersion wavelength, the occurrence of tilt is suppressed. However, due to production variations of the HNLF, the zero dispersion wavelength of the wavelength converter on the transmission side may be different from the zero dispersion wavelength of the wavelength converter on the reception side. In this case, the wavelength of the main signal entering the receiver deviates from the ITU grid, and there arises a problem that the main signal may not be received.

The following is a reference document.

[Document 1] Japanese Laid-open Patent Publication No. 2000-75330.

SUMMARY

According to an aspect of the embodiments, an optical transmission apparatus includes a wavelength converter that wavelength-converts input signal light using a nonlinear optical medium to output the converted signal light, a memory that holds first information relating to a wavelength conversion characteristic of the wavelength converter, a communication interface that receives second information relating to a second wavelength conversion characteristic of an adjacent optical transmission apparatus, and a control circuit that determines, using the first information and the second information when the second information is received, an excitation light frequency at which a gain deviation of main signal light subjected to a wavelength conversion is minimized to set the determined excitation light frequency in the wavelength converter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a diagram illustrating a configuration example of an HNLF characteristic table;

FIG. 17 is a diagram for explaining a method of calculating excitation light frequency;

FIG. 22 is a diagram for explaining the setting of an optimum excitation light frequency with a frequency difference within an allowable range;

DESCRIPTION OF EMBODIMENTS

The chromatic dispersion for a nonlinear optical medium, which is not limited to HNLF, includes dispersion occurring due to the material and dispersion occurring due to the structure. With an optical fiber, a zero dispersion wavelength is controlled by adjusting the dispersion occurring due to the structure by designing the refractive index profile of its cross section. The optical fiber is manufactured so that the refractive index profile is as uniform as possible by controlling manufacturing conditions. However, the dispersion of the zero dispersion wavelength may not be made zero.

In the optical transmission apparatus according to an embodiment, by using wavelength conversion characteristic information of the own station and wavelength conversion characteristic information of the partner station, control is performed so that the excitation light wavelength is made dose to the zero dispersion wavelength of the nonlinear optical medium to be used. For example, the wavelength conversion characteristic (hereinafter referred to as HNLF characteristic as appropriate) of a nonlinear optical medium such as the HNLF is measured in advance, and stored in a memory or the like. A unit is provided between a first-time wavelength conversion unit (wavelength conversion unit on the transmission side) and a second-time wavelength conversion unit (wavelength conversion unit on the reception side) to notify the partner station of the HNLF characteristic of the own station. Upon receiving the HNLF characteristic, the optical transmission apparatus calculates an optimum excitation light frequency based on the HNFL characteristic of the own station and the received HNLF characteristic, and sets the calculated frequency or wavelength to the pump light source.

The optimum excitation light frequency is a frequency at which a gain deviation of the main signal light having undergone the wavelength conversions twice is minimized. For example, the optimum excitation light frequency is a frequency at which the power ratio of the output light of the second-time wavelength converter with respect to the input light to the first-time wavelength converter, or deterioration of the conversion efficiency of the output light of the second-time wavelength converter with respect to the input light to the first-time wavelength converter is minimized.

Basic Configuration

Figure 1A:
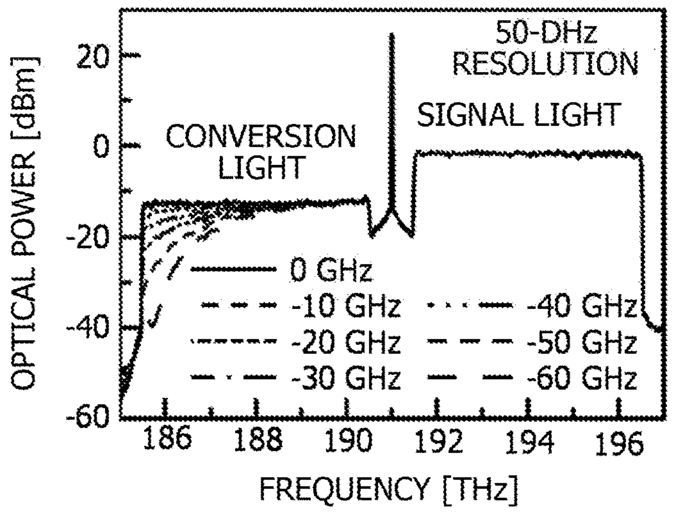
FIGS. 1A to 1C are diagrams illustrating a tilt generated in main signal light when a zero dispersion frequency does not coincide with an excitation light frequency.
Figure 1B:
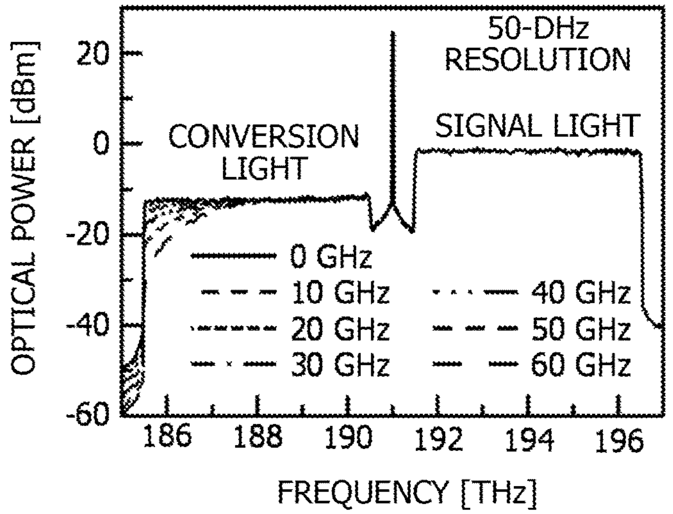
Figure 1C:
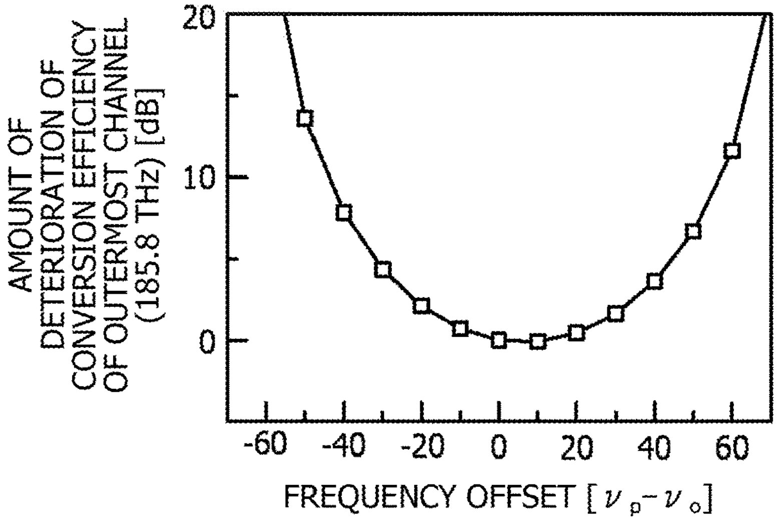
Figure 2:
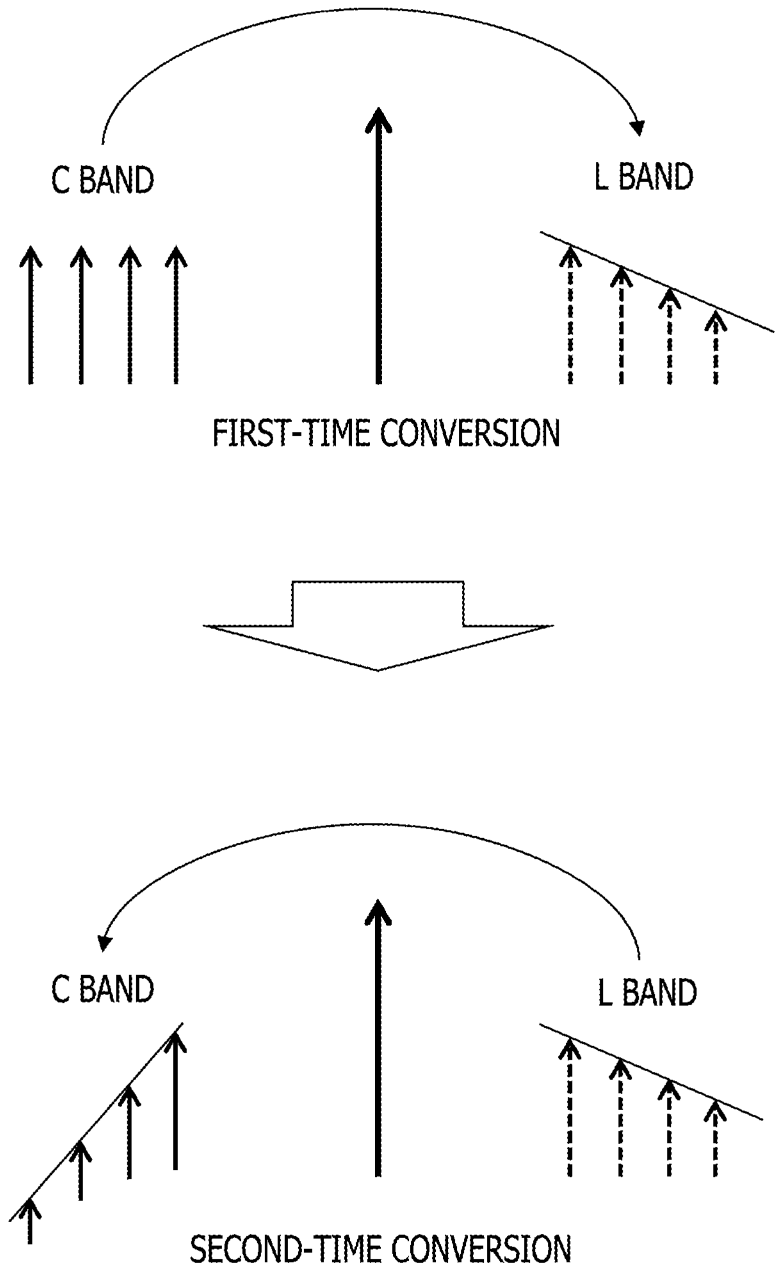
FIG. 2 is a diagram for explaining the influence of a tilt which occurs in a wavelength conversion.
Figure 3:
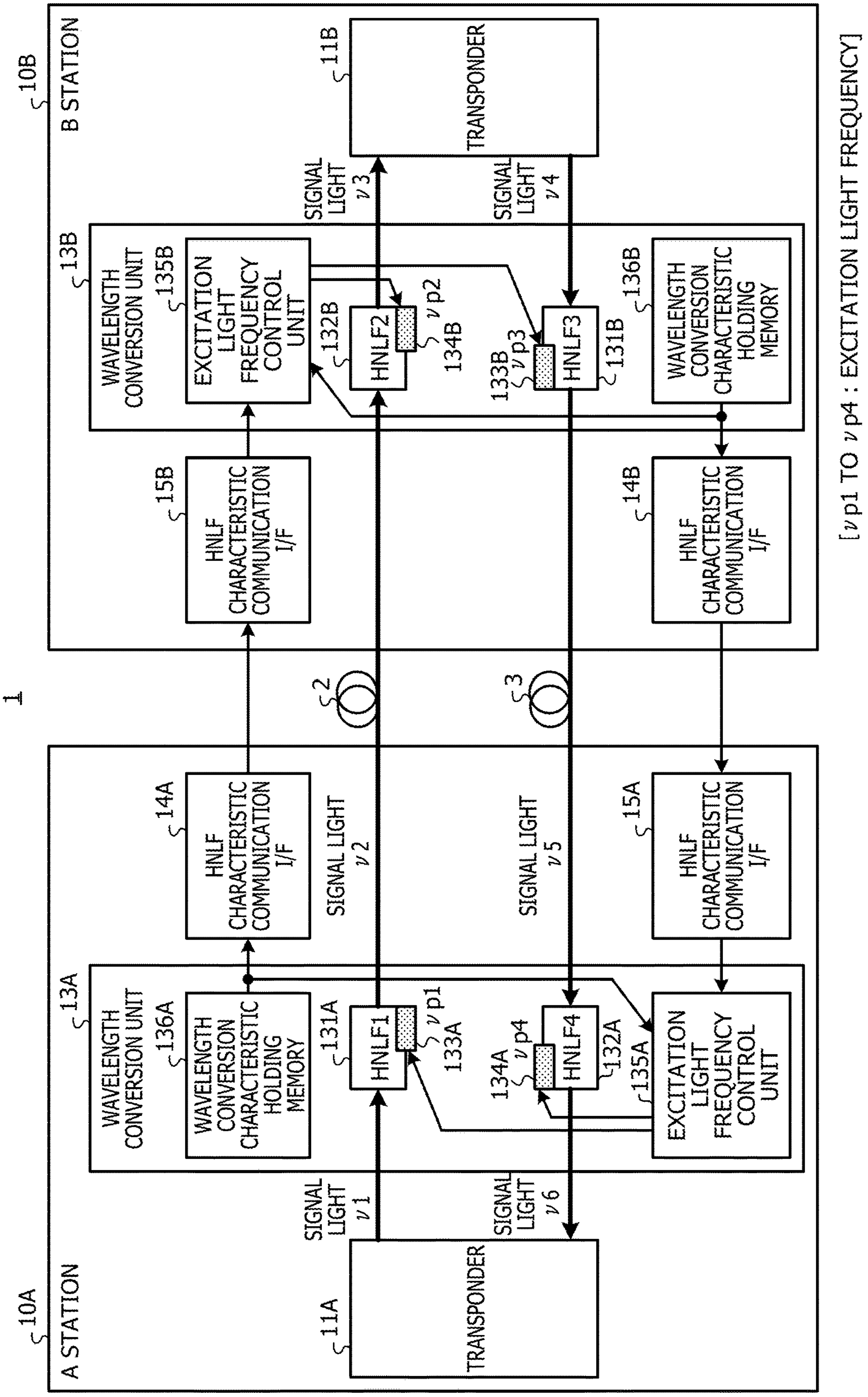
FIG. 3 is a basic configuration diagram of an optical transmission system according to an embodiment.

FIG. 3 is a basic configuration diagram of an optical transmission system 1 according to the embodiment. The optical transmission system 1 includes an optical transmission apparatus 10A (A station), and an optical transmission apparatus 10B (B station). The optical transmission apparatus 10A and the optical transmission apparatus 10B have a wavelength conversion function using a nonlinear optical effect. As an example, the HNLF is used to perform the wavelength conversion function. The optical transmission apparatuses 10A and 10B are connected to each other by optical transmission lines 2 and 3, and bidirectional communication with each other is possible. In the following description, in order to distinguish the two optical transmission apparatuses 10, "A" is assigned to one optical transmission apparatus 10 and its constituent elements as the reference sign, and "B" is assigned to the other optical transmission apparatus 10 and its constituent elements as the reference sign. The two optical transmission apparatuses 10 have the identical configuration, and are generically referred to without the alphabet as appropriate.

The optical transmission apparatus 10A includes a transponder 11A, a wavelength conversion unit 13A, and HNLF characteristic communication interfaces (I/F) 14A and 15A. The wavelength conversion unit 13A includes a wavelength converter 131A and a wavelength converter 132A. The wavelength converters 131A and 132A are wavelength converters using the HNLF, and perform a wavelength conversion using pump light sources 133A and 134A respectively. The pump light sources 133A and 134A are light sources combining an EDFA with a DFB (Distributed Feedback) laser that outputs narrowband excitation light of a single mode, for example.

The HNLF of the wavelength converter 131A of the optical transmission apparatus 10A is denoted as HNLF1, and the excitation light frequency of the pump light source 133A is denoted as νp1. The HNLF of the wavelength converter 132A is denoted as HNLF4, and the excitation light frequency of the pump light source 134A is denoted as νp4.

The wavelength conversion unit 13A of the optical transmission apparatus 10A includes an excitation light frequency control unit 135A and an HNLF characteristic holding memory 136A. The HNLF characteristic holding memory 136A holds characteristic information of the HNLF1 and characteristic information of the HNLF4. The excitation light frequency control unit 135A calculates the excitation light frequencies νp1 and νp4 to be set to the pump light sources 133A and 134A respectively based on the information stored in the HNLF characteristic holding memory 136A, and the HNLF characteristic information of the opposed optical transmission apparatus 10B.

The basic configuration of the optical transmission apparatus 10B is the same as that of the optical transmission apparatus 10A, and includes a transponder 115, a wavelength conversion unit 13B, and HNLF characteristic communication interfaces 14B and 15B. The HNLF of a wavelength converter 132B of the optical transmission apparatus 10B is denoted as HNLF2, and the excitation light frequency of the pump light source 134 is denoted as νp2. The HNLF of the wavelength converter 131 on the transmission side of the optical transmission apparatus 10B to the network is denoted as HNLF3, and the excitation light frequency of the pump light source 133 is denoted as νp3.

An HNLF characteristic holding memory 136B of the wavelength conversion unit 13B of the optical transmission apparatus 10B holds characteristic information of the HNLF3, and characteristic information of the HNLF2. An excitation light frequency control unit 1358 of the optical transmission apparatus 10B calculates excitation light frequencies νp3 and νp2 to be set to the pump light sources 133B and 1348 respectively based on the information stored in the HNLF characteristic holding memory 136B and the HNLF characteristic information of the opposed optical transmission apparatus 10A.

Between the optical transmission apparatuses 10A and 10B, the excitation light frequencies νp1 and νp2 are calculated to values at which the gain deviation or the tilt of the main signal light having undergone the wavelength conversion (first-time wavelength conversion) by the wavelength converter 131A and the wavelength conversion (second-time wavelength conversion) by the wavelength converter 132B is minimized.

Similarly, the excitation light frequencies νp3 and νp4 are calculated to values at which the gain deviation or the tilt of the main signal light having undergone the wavelength conversion (first-time wavelength conversion) by a wavelength converter 131B and the wavelength conversion (second-time wavelength conversion) by the wavelength converter 132A is minimized.

The optical transmission apparatus 10, through the HNLF characteristic communication interfaces 14 and 15, notifies the partner station of the HNLF characteristic information of the own station to share the HNLF characteristic information of the own station with the partner station. The NHLF characteristic holding memory 136 and the excitation light frequency control unit 135 are not necessarily arranged inside the wavelength conversion unit 13, and may be implemented by a memory and a processor which are arranged inside of each device. For simplicity of illustration, a single transponder 11 is depicted in the optical transmission apparatus 10. However, a plurality of transponders 11 is generally arranged in each optical transmission apparatus 10, and a plurality of client signals is transmitted and received by the WDM method. A multiplexer (MUX) is inserted between the plurality of transponders 11 and the wavelength converter 131, and a demultiplexer (DEMUX) is inserted between the plurality of transponders 11 and the wavelength converter 132.

The operation of the optical transmission system 1 after the excitation light frequency is set in the optical transmission apparatus 10A and the optical transmission apparatus 10B is as follows. The wavelength converter 131A of the optical transmission apparatus 10A converts signal light ν1 input from the transponder 11A into signal light ν2 of different wavelength using excitation light νp1. The signal light ν2 is transmitted to the optical transmission apparatus 10B through the optical transmission line 2, and input to the wavelength converter 132B of the optical transmission apparatus 10B. The wavelength converter 132B converts the received signal light ν2 into the signal light ν3 of the original wavelength using the excitation light νp2, and outputs it to the transponder 11B.

In reverse communication, the wavelength converter 1318 of the optical transmission apparatus 10B convert the signal light ν4 input from the transponder 11B into the signal light ν5 of the different wavelength using the excitation light νp3. The signal light ν5 is transmitted to the optical transmission apparatus 10A through the optical transmission line 3, and input to the wavelength converter 132A of the optical transmission apparatus 10A. The wavelength converter 132A converts the received signal light ν5 into the signal light ν6 of the original wavelength using the excitation light νp4, and outputs it to the transponder 11A.

Each of the optical transmission apparatus 10A and the optical transmission apparatus 10B autonomously sets the optimum excitation light wavelength for the pump light sources 133 and 134 of the own station using the wavelength conversion characteristic information of the own station, and the wavelength conversion characteristic information of the partner station. As a result, the gain deviation or tilt of the main signal light having undergone the wavelength conversion twice is minimized, and wideband wavelength conversion is implemented. The frequency bands of the optical transmission lines 2 and 3 are effectively used, and the high quality optical transmission system 1 is provided.

Circumstances of Calculation or Recalculation of Excitation Light Frequency

The relationship of the wavelength conversion efficiency between the opposed optical transmission apparatuses 10 changes when any one of the optical transmission apparatuses 10 has been newly introduced into the optical transmission system 1 (when the connection topology has changed), or when the wavelength converter 131 or 132 is exchanged in any one of the optical transmission apparatuses 10. When an event occurs in which the characteristic (zero dispersion frequency and so forth) of the wavelength converter may change, for example, when the wavelength converter 131 (or 132) is replaced, or when a new device is introduced, the excitation light frequencies of the pump light sources 133 and 134 are recalculated.

The excitation light frequency may be recalculated at the time of activation of any one of the optical transmission apparatuses 10 after its repair/maintenance. In a case where wavelength conversion characteristic information is transmitted and received using optical supervisory channel (OSC), the excitation light frequency may be recalculated at the time of recovery from optical transmission line disconnection, recovery from an interruption of the OSC signal, replacement of the failed OSC module, or the like. In a case of optical transmission via a relay station, the excitation light frequency is recalculated at the time of recovery from the optical transmission line disconnection in the relay section, or at the time of recovery from an interruption of the OSC signal.

In a case where the HNLF characteristic information is transferred by the network management operation system (NE-OPS), an optical transmission apparatus 10 or the wavelength conversion unit 13 that performs the wavelength conversion is not monitored by the NE-OPS, and even when restoration is carried out thereafter, the excitation light frequency is recalculated.

When an event which may change the wavelength conversion characteristic of the wavelength converter occurs, the optical transmission apparatus 10 outputs the HNLF characteristic information stored in the HNLF characteristic holding memory 136 to a supervisory channel or a supervisory path repeatedly. At the same time, the optical transmission apparatus 10 waits for the reception of the HNLF characteristic information from the partner station.

When HNLF characteristic information is exchanged between two opposed optical transmission apparatuses 10, the optical transmission apparatus 10, using the HNLF characteristic information of the own station and the received HNLF characteristic information, determines the optimum excitation light frequency for the wavelength converters 131 and 132 which is used in the own station. The timing of calculation or recalculation of the excitation light frequency will be described again in each embodiment described later.

Figure 4:
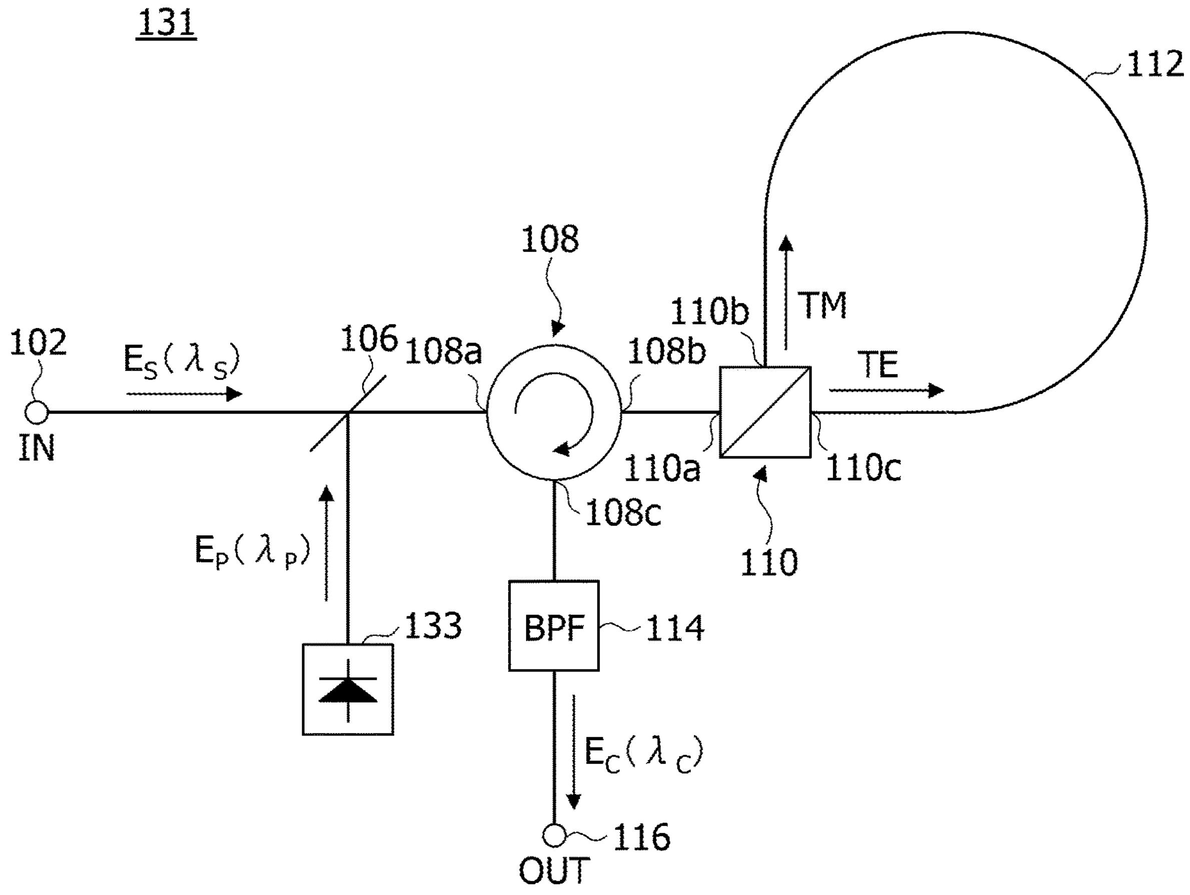
FIG. 4 is a diagram illustrating an example of a wavelength converter used in an embodiment.

FIG. 4 illustrates a configuration example of the wavelength converter 131 (or 132) used in the optical transmission apparatuses 10A and 10B. The signal light Es of the wavelength λs input to a port 102 of the wavelength converter 131 is multiplexed with the excitation light Ep from the pump light source 133 by a WDM coupler 106, and input to a port 108*a* of an optical circulator 108. The multiplexed signal is output from a port 108*b* of the optical circulator 108, and input to a port 110*a* of a polarization beam splitter (PBS) 110. In the PBS110, the signal light is divided into the TE polarized wave and the TM polarized wave, which are output to ports 110*c* and 110*b* respectively.

The ports 110*c* and 110*b* of the PBS110 are connected to an HNLF112. The HNLF112 has two main axes. The port 110 C of the PBS110 is connected to the HNLF112 at an angle at which the polarized wave in TE mode matches with the first principal axis at one end of the HNLF112. The port 110*b* of the PBS110 is connected to the HNLF112 at an angle such that the polarized wave in TM mode matches with the first principal axis at the other end of the HNLF112. The polarized wave in the TE mode and the polarized wave in the TM mode are subjected to the wavelength conversion by FWM in the HNLF112, and the wavelength conversion light Ec is generated. The PBS110 also serves as a polarization beam combiner. The wavelength conversion light Ec is input to the port 108*b* of the optical circulator 108 from the port 110*a* of the PBS110. This signal is output to a port 108*c* of the optical circulator 108. The excitation light Ep and the input light Es are removed by an optical wavelength filter 114, and optical signal Ec having a wavelength λc is output.

Instead of the configuration of FIG. 4, after dividing the input signal light (for example, C band light) into TE polarized wave (orthogonal polarized wave) and TM polarized wave (horizontal polarized wave), excitation light branched into respective polarization components may be multiplexed, and each multiplexed wave may be wavelength-converted by a nonlinear optical medium. In this case, after each residual excitation light is removed from the wavelength conversion light of each polarized wave, and the wavelength conversion light is polarization multiplexed, the wavelength conversion light (for example, L band light) may be output.

Figure 5:
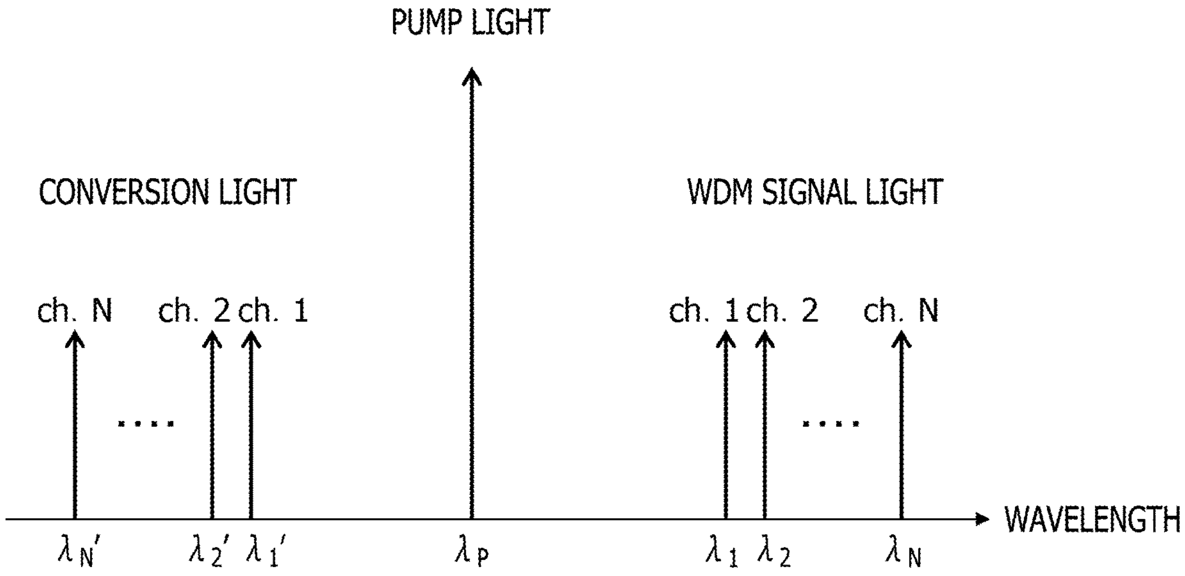
FIG. 5 is a diagram for explaining collective conversion of WDM signals by a wavelength converter.

FIG. 5 is a diagram illustrating collective conversion of WDM signals by the wavelength converter 131 (or 132). Optical signals of the different wavelength input from the plurality of transponders 11 may be collectively wavelength-converted by the wavelength converter 131. WDM signal light is obtained by wavelength division multiplexing N channel optical signals having different wavelengths λ1, λ2 . . . λN, where λ1 is the shortest wavelength, and λN is the longest wavelength. The excitation light wavelength λp is set lower than the wavelength λ1. The WDM signal light is converted into conversion light by the FWM using the excitation light. The signal light includes N-channel conversion light signals having different wavelengths λ1', λ2' . . . λN'. In each channel, the arrangement of the input signal specific light and the conversion light is symmetrical with respect to the wavelength λp of the pump light.

Information on the wavelength conversion characteristic (HNLF characteristic) is mutually exchanged between the optical transmission apparatus 10A and the optical transmission apparatus 10B, and an optimum excitation light wavelength at which the chromatic dispersion or the tilt is minimized from information of the own station and information of the partner station is determined. Therefore, a flat conversion efficiency may be obtained with the optical signal of each channel, and the influence of tilt may be reduced.

Although FIG. 5 illustrates the conversion from the long wavelength band to the short wavelength band, equivalent conversion efficiency may be obtained in the same way even by conversion from the short wavelength band to the long wavelength band.

Figure 6:
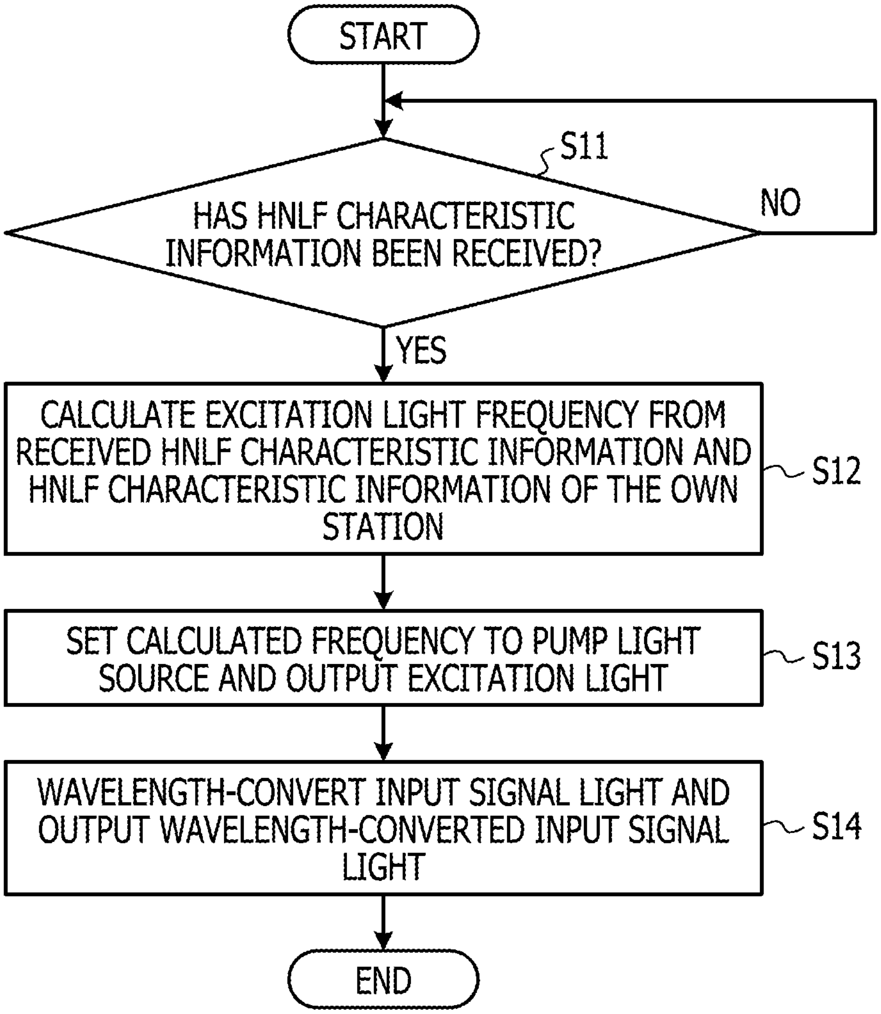
FIG. 6 is a basic flow of operations of an optical transmission apparatus according to the embodiment.

FIG. 6 is a basic flow of the operation of the optical transmission apparatus 10B. It is assumed that the optical transmission apparatus 10B is newly introduced. When the power is turned on, the optical transmission apparatus 10B waits for the reception of HNLF characteristic information from the partner station (S11). At the same time, the optical transmission apparatus 10B repeatedly outputs the HNLF characteristic information owned by the own station. The HNLF characteristic information is an example of wavelength conversion characteristic information. When the optical transmission apparatus 10B is introduced into the system, the optical transmission apparatus 10B does not recognize which device is the partner station, and the excitation wavelengths of the pump light sources 133B and 134B remain unadjusted.

Upon receiving the HNLF characteristic information from the partner station ("YES" in S11), the excitation light frequency at which the gain deviation or the tilt of the main signal light having undergone the wavelength conversion twice is minimized is calculated from the received HNLF characteristic information and the HNLF characteristic information of the own station (S12). The calculated excitation light frequency is set to the pump light sources 133 and 134, and the excitation light is output (S13). Thereafter, the input signal light is subjected to the wavelength conversion and output (S14). When receiving the wavelength-converted signal light ν2 from the network side, the signal light ν2 is wavelength-converted using the excitation light, and the signal light ν3 of the original wavelength is output to the transponder 11. When the signal light ν4 transmitted from the transponder 11 to the network is input, the signal light ν4 is wavelength-converted, and the wavelength-converted signal light ν5 is output to the optical transmission line 3.

The same processing is performed in the optical transmission apparatus 10A. Referring to FIG. 3, both the optical transmission apparatus 10A and the optical transmission apparatus 10B wait for the reception of HNLF characteristic information from the partner station while repeatedly outputting the HNLF characteristic information of the own station. When the HNLF characteristic information from the partner station is obtained, the excitation light frequency of the pump light sources 133 and 134 of the own station is set to the optimum frequency using the acquired HNLF characteristic information and the HNLF characteristic information of the own station.

First Embodiment

Figure 7:
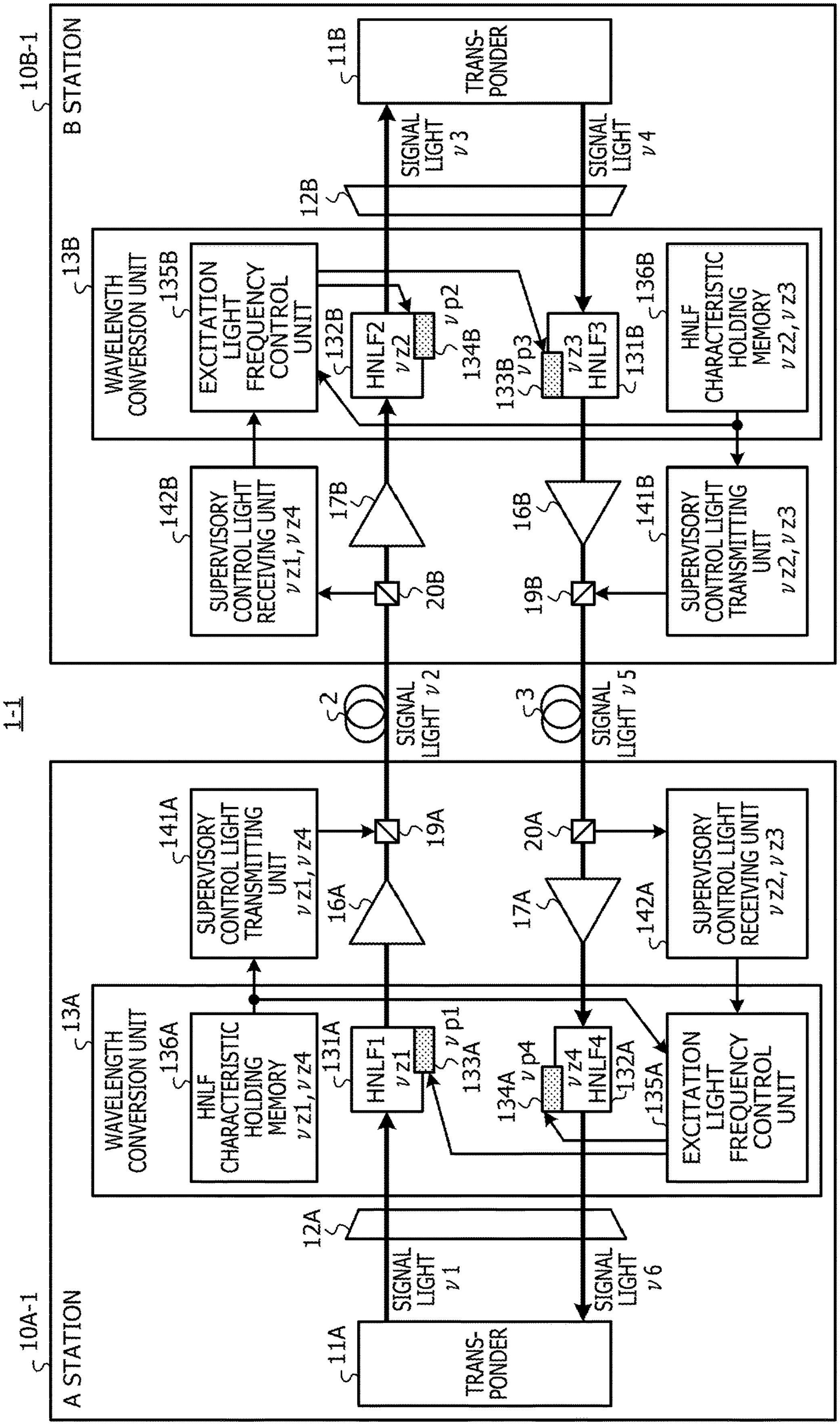
FIG. 7 is a schematic diagram of an optical transmission system according to a first embodiment.

FIG. 7 is a schematic diagram of an optical transmission system 1-1 according to a first embodiment. The optical transmission system 1-1 includes an optical transmission apparatus 10A-1 (A station) and an optical transmission apparatus 10B-1 (B station). The basic configuration of the optical transmission system 1-1 is the same as the basic configuration of FIG. 3. The features according to the first embodiment will be mainly described.

In the first embodiment, the zero dispersion frequency of the wavelength converters 131 and 132 is stored in the HNLF characteristic holding memory 136 as wavelength conversion characteristic information. The HNLF characteristic holding memory 136A of an optical transmission apparatus 10A-1 stores the zero dispersion frequency νz1 of the HNLF1 of the wavelength converter 131A, and the zero dispersion frequency νz4 of the HNFL4 of the wavelength converter 132A. The HNLF characteristic holding memory 136B of an optical transmission apparatus 10B-1 stores the zero dispersion frequency νz3 of the HNLF3 of the wavelength converter 131B, and stores the zero dispersion frequency νz2 of the HNFL2 of the wavelength converter 132B.

A supervisory control light transmitting unit 141 and a supervisory control light receiving unit 142 are used as the HNLF characteristic communication interfaces 14 and 15. The HNLF characteristic information is transmitted and received using the optical supervisory channel (OSC). One wavelength of WDM is assigned to the OSC, and the OSC bidirectionally connects adjacent nodes. The supervisory control light transmitting unit 141 and the supervisory control light receiving unit 142 may be implemented by one OSC card or one OSC module.

An optical amplifier 16 and a WDM coupler 19 are arranged at the output stage of the wavelength conversion unit 13 to the network. The zero dispersion frequency information output from the supervisory control light transmitting unit 141 is output to the same output port as the signal light through the WDM coupler 19, and is sent out to the optical transmission line 2. An optical amplifier 17 and a WDM coupler 20 are arranged at the input stage of the wavelength conversion unit 13 from the network. The zero dispersion frequency information received from the optical transmission line 3 is demultiplexed by the WDM coupler 20, and input to the supervisory control light receiving unit 142.

Upon receiving the zero dispersion frequencies νz1 and νz4 from the optical transmission apparatus 10A-1, the optical transmission apparatus 10B-1 reads out zero dispersion frequencies νz2 and νz3 of the own station from the HNLF characteristic holding memory 136B. The excitation light frequency control unit 1358 calculates and sets the excitation light frequency νp3 of the pump light source 1338 and the excitation light frequency νp2 of the pump light source 134B using the zero dispersion frequencies νz1, νz4, νz2, and νz3.

The excitation light frequencies νp2 and νp3 of the optical transmission apparatus 10B-1 are calculated by the equation (1).

$$\nu p2=(\nu z1+\nu z2)/2$$

$$\nu p3=(\nu z3+\nu z4)/2 \quad (1)$$

The excitation frequency νp2 of the pump light source 1348 is set to an average value of the zero dispersion frequency νz1 of the wavelength converter 131A of the opposed optical transmission apparatus 10A-1, and the zero dispersion frequency νz2 of the wavelength converter 132B of the own station.

The excitation frequency νp3 of the pump light source 133B is set to an average value of the zero dispersion frequency νz3 of the wavelength converter 131B of the own station, and the zero dispersion frequency νz4 of the wavelength converter 132A of the opposed optical transmission apparatus 10A-1.

Upon receiving the zero dispersion frequencies νz2 and νz3 from the optical transmission apparatus 10B-1, the optical transmission apparatus 10A-1 calculates and sets the excitation light frequency νp1 of the pump light source 133A, and the excitation light frequency νp4 of the pump light source 134A using the received zero dispersion frequencies νz2 and νz3, and the zero dispersion frequencies νz1 and νz4 of the own station.

The excitation light frequencies νp1 and νp4 of the optical transmission apparatus 10A-1 are calculated by the equation (2).

$$\nu p1=(\nu z1+\nu z2)/2$$

$$\nu p4=(\nu z3+\nu z4)/2 \quad (2)$$

The excitation frequency νp1 of the pump light source 133A is set to an average value of the zero dispersion frequency νz1 of the wavelength converter 131A of the own station, and the zero dispersion frequency νz2 of the wavelength converter 132B of the opposed optical transmission apparatus 10B-1.

The excitation frequency νp4 of the pump light source 134A is set to an average value of the zero dispersion frequency νz3 of the wavelength converter 131B of the opposed optical transmission apparatus 10B-1, and the zero dispersion frequency νz4 of the wavelength converter 132A of the own station.

As may be seen from equations (1) and (2), νp1=νp2, and νp4=νp3. The same excitation light frequency at which the deterioration of the main signal light after the conversion has been performed twice between the optical transmission apparatus 10A-1 and the optical transmission apparatus 10B-1 is minimized is set, whereby it is possible to receive main signal light with less deterioration in the ITU grid.

Figure 8:
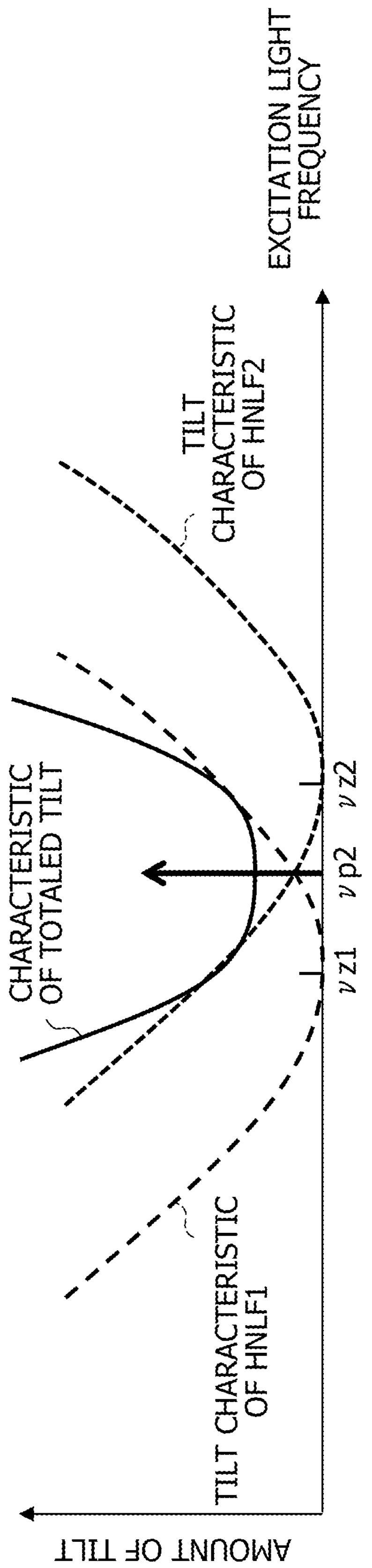
FIG. 8 is a diagram for explaining the effect of setting an excitation light frequency.

FIG. 8 is a diagram for explaining the effect of setting the excitation light frequency. The horizontal axis represents the excitation light frequency, and the vertical axis represents the amount of tilt. The amount of tilt of the HNLF1 of the optical transmission apparatus 10A-1 is minimized at the zero dispersion frequency νz1, and increases as it goes away from the zero dispersion frequency νz1. Although the tilt characteristic of the HNLF2 of the optical transmission apparatus 10B-1 is not the same as that of the HNFL1, the tendency of the tilt characteristic of the HNLF2 is the same as that of the HNFL1. The amount of tilt is the minimum at the zero dispersion frequency νz2, and increases as it goes away from the zero dispersion frequency νz2.

The solid line in FIG. 8 illustrates the characteristic of the totaled tilt of the HNLF1 and the HNLF2. The characteristic of the totaled tilt is minimized at the midpoint or the average point of the zero dispersion frequencies νz1 and νz2. As illustrated in FIG. 8, although the characteristic curves of the HNLF1 and the HNLF2 are almost symmetrical, and are similar in shape, they have different zero dispersion frequencies. In this case, by setting the excitation light frequency νp2 to the average value of the zero dispersion frequency, it is possible to suppress the tilt and keep the wavelength conversion efficiency flat.

In the optical transmission system 1-1, the excitation light frequency is recalculated at the time of replacement of the failed supervisory control light transmitting unit 141 or the failed supervisory control light receiving unit 142 in addition to when the wavelength converter 131 or 132 is replaced, and when a new optical transmission apparatus 10 is introduced. The excitation light frequency is recalculated at the time of recovery from the interruption of the OSC signal, and at the time of recovery from disconnection of the optical transmission line 2 or 3. The fundamental flow of the wavelength conversion and transmission/reception of the optical signal after setting the excitation light frequency is as follows.

In the optical transmission apparatus 10A-1, the WDM signals ν1 obtained by wavelength division multiplexing the client signals from the plurality of transponders 11A with the optical multiplexer/demultiplexer (MUX/DEMUX) 12A are collectively converted into the signal light ν2 in the wavelength converter 131A. The signal light ν2 is amplified by an optical amplifier 16A, passes through a WDM coupler 19A, and is output to the optical transmission line 2.

In the optical transmission apparatus 10B-1, the signal light ν2 received after passing through a WDM coupler 20B is amplified by an optical amplifier 178, and input to the wavelength conversion unit 138. The signal light ν2 is collectively converted into the signal light ν3 by the wavelength converter 1328. The components of respective wavelengths included in the signal light ν3 are substantially equal to the components of the respective wavelengths included in the transmitted WDM signal ν1. The signal light ν3 is separated into signals with respective wavelengths by an optical multiplexer/demultiplexer 12B, and is supplied to the corresponding transponder 118.

In reverse communication, the wavelength converter 131B of the optical transmission apparatus 10B-1 convert the signal light ν4 input from the transponder 11B into the signal light ν5 of the different wavelength. The signal light ν5 is amplified by the optical amplifier 168, passes through a WDM coupler 198, and is output to the optical transmission line 3. The signal light ν5 received by the optical transmission apparatus 10A-1 passes through a WDM coupler 20A, is amplified by an optical amplifier 17A, and is input to the wavelength converter 132A. The wavelength converter 132A converts the input signal light ν5 into the signal light ν6 of the original wavelength, and outputs it to the transponder 11A.

In any directional communication, since the excitation light frequencies of the pump light sources 133 and 134 is set to a frequency at which the total amount of tilt is minimized, a flat wavelength conversion efficiency may be obtained by suppressing the tilt of the main signal light having undergone the wavelength conversion twice.

Figure 9:
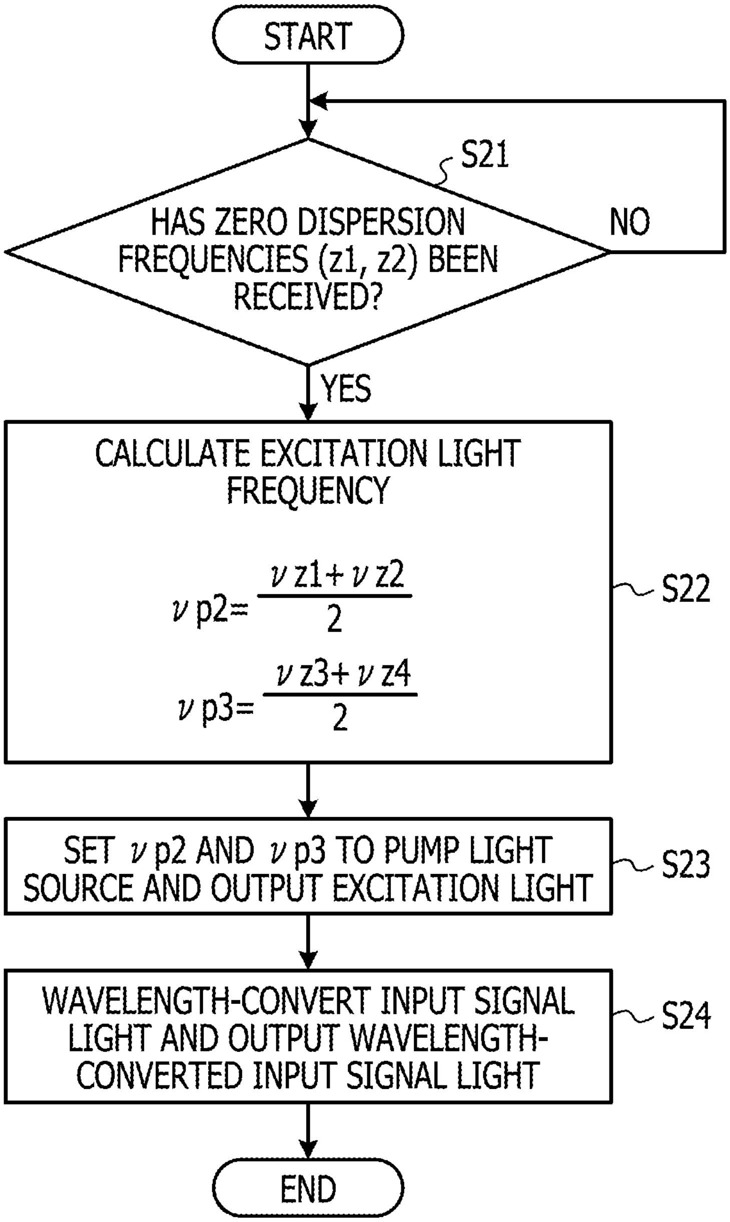
FIG. 9 is a flowchart of the operation of the optical transmission apparatus of the first embodiment.

FIG. 9 illustrates an operation flow of the optical transmission apparatus 10B-1 according to the first embodiment. When an event that may change a wavelength conversion characteristic in relation to the partner station, such as replacement of wavelength converter 131 or 132, or recovery from optical transmission line disconnection, occurs, the optical transmission apparatus 10B-1 waits for the reception of the zero dispersion frequency (S21). Simultaneously, the zero dispersion frequency of the own station may be repeatedly output. Upon receiving the zero dispersion frequency from the partner station ("YES" in S21), excitation light frequencies (νp2, νp3) are calculated from equations (1) and (2) using the received zero dispersion frequencies (νz1, νz4), and the zero dispersion frequencies (νz2, νz3) of the own station (S22).

After setting the calculated excitation light frequency to the pump light source, the excitation light is output (S23), and the input signal light is subjected to the wavelength conversion using the excitation light and output (524).

The same operation flow is performed in the optical transmission apparatus 10A-1. According to this method, an optimum excitation light frequency is set in both the optical transmission apparatus 10A-1 and the optical transmission apparatus 10B-1 which are opposed to each other. It is possible to minimize the tilt of the main signal having undergone the wavelength conversion twice.

Second Embodiment

Figure 10:
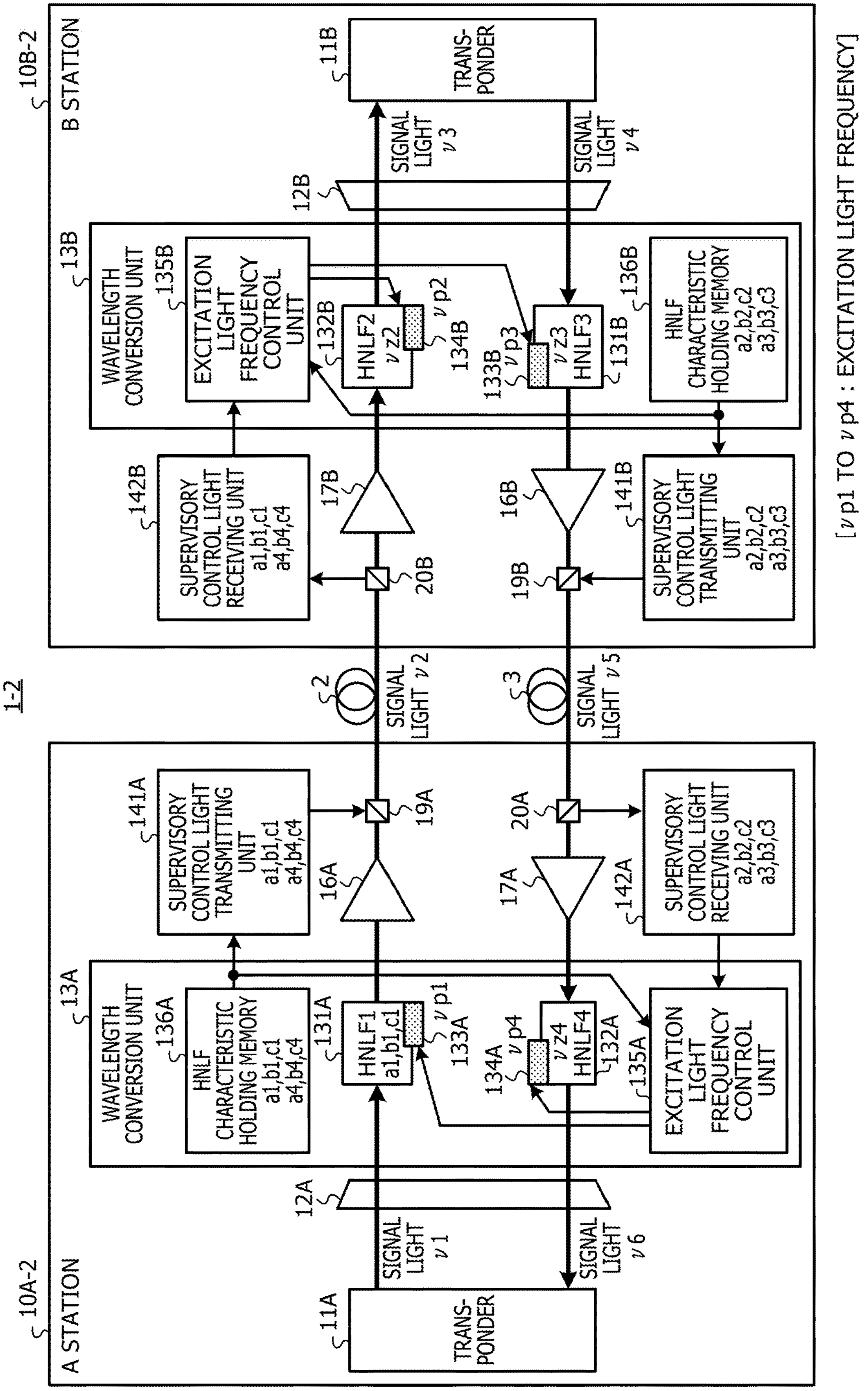
FIG. 10 is a schematic diagram of an optical transmission system according to a second embodiment.

FIG. 10 is a schematic diagram of an optical transmission system 1-2 according to an second embodiment. The optical transmission system 1-2 includes an optical transmission apparatus 10A-2 (A station) and an optical transmission apparatus 10B-2 (B station). The basic configuration of the optical transmission system 1-2 is the same as the basic configuration of the optical transmission system 1-1 according to the first embodiment. The features of the second embodiment will mainly be described.

In the second embodiment, information indicating the wavelength conversion characteristic of the wavelength converters 131 and 132 by an approximate expression or a function is held as the wavelength conversion characteristic information. As in the first embodiment, the HNLF characteristic is used as an example of the wavelength conversion characteristic. The coefficients of the approximate curve of the quadratic function are stored in the HNLF characteristic holding memory 136 as information of the approximate expression or the function.

As in the first embodiment, the supervisory control light transmitting unit 141 and the supervisory control light receiving unit 142 are used as the HNLF characteristic communication interfaces 14 and 15. The coefficient information of the approximate curve representing the HNLF characteristic is transmitted and received between the optical transmission apparatus 10A-2 and the optical transmission apparatus 10B-2 using the OSC.

When the generated the amount of tilt y is expressed as a quadratic function of the excitation light frequency x, the amount of tilt is expressed by the following expression.

$$y=ax^2+bx+c \tag{3}$$

For each of the wavelength converters 131 and 132, a set of coefficients (a, b, c) is held as HNLF characteristic information.

The HNLF characteristic holding memory 136A of the optical transmission apparatus 10A-2 holds the coefficients (a1, b1, c1) as the wavelength conversion characteristic of the HNLF1, and holds the coefficients (a4, b4, c4) as the wavelength conversion characteristic of the HNLF4.

The HNLF characteristic holding memory 136B of the optical transmission apparatus 10B-2 holds the coefficients (a2, b2, c2) as the wavelength conversion characteristic of the HNLF2, and holds the coefficients (a3, b3, c3) as the wavelength conversion characteristic of the HNLF3.

The coefficient information output from a supervisory control light transmitting unit 141A of the optical transmission apparatus 10A-2 is output to the same output port as that of the signal light through the WDM coupler 19A, and is sent out to the optical transmission line 2. The coefficient information (a1, b1, c1) and (a4, b4, c4) from the optical transmission apparatus 10A-2 is received by a supervisory control light receiving unit 142B of the optical transmission apparatus 10B-2 through the WDM coupler 20B, and is supplied to the excitation light frequency control unit 1358. The excitation light frequency control unit 135B reads the coefficient information (a2, b2, c2) and (a3, b3, c3) of the own station from the HNLF characteristic holding memory 136B. The excitation light frequency control unit 1358 calculates and sets the excitation light frequency νp3 of a pump light source 133B, and the excitation light frequency νp2 of the pump light source 1348 using the coefficient information (a1, b1, c1), (a4, b4, c4), (a2, b2, c2), and (a3, b3, c3).

Similarly, the coefficient information (a2, b2, c2) and (a3, b3, c3) output from a supervisory control light transmitting unit 1418 of the optical transmission apparatus 10B-2 is transmitted from the WDM coupler 198 to a transmission line 3. The coefficient information (a2, b2, c2) and (a3, b3, c3) of the optical transmission apparatus 10B-2 is received by a supervisory control light receiving unit 142A of the optical transmission apparatus 10A-2 through the WDM coupler 20A, and is supplied to the excitation light frequency control unit 135A. The excitation light frequency control unit 135A reads the coefficient information (a1, b1, c1) and (a 4, b 4, c 4) of the own station from the HNLF characteristic holding memory 136A. The excitation light frequency control unit 135A calculates and sets the excitation light frequency νp1 of the pump light source 133A, and the excitation light frequency νp4 of the pump light source 134A using the coefficient information (a1, b1, c1), (a4, b4, c4), (a2, b2, c2), and (a3, b3, c3).

The coefficient information of the respective wavelength converters 131 and 132 of each optical transmission apparatus 10-2 is measured in advance at the time of manufacture, and is stored in the HNLF characteristic holding memory 136.

Figure 11:
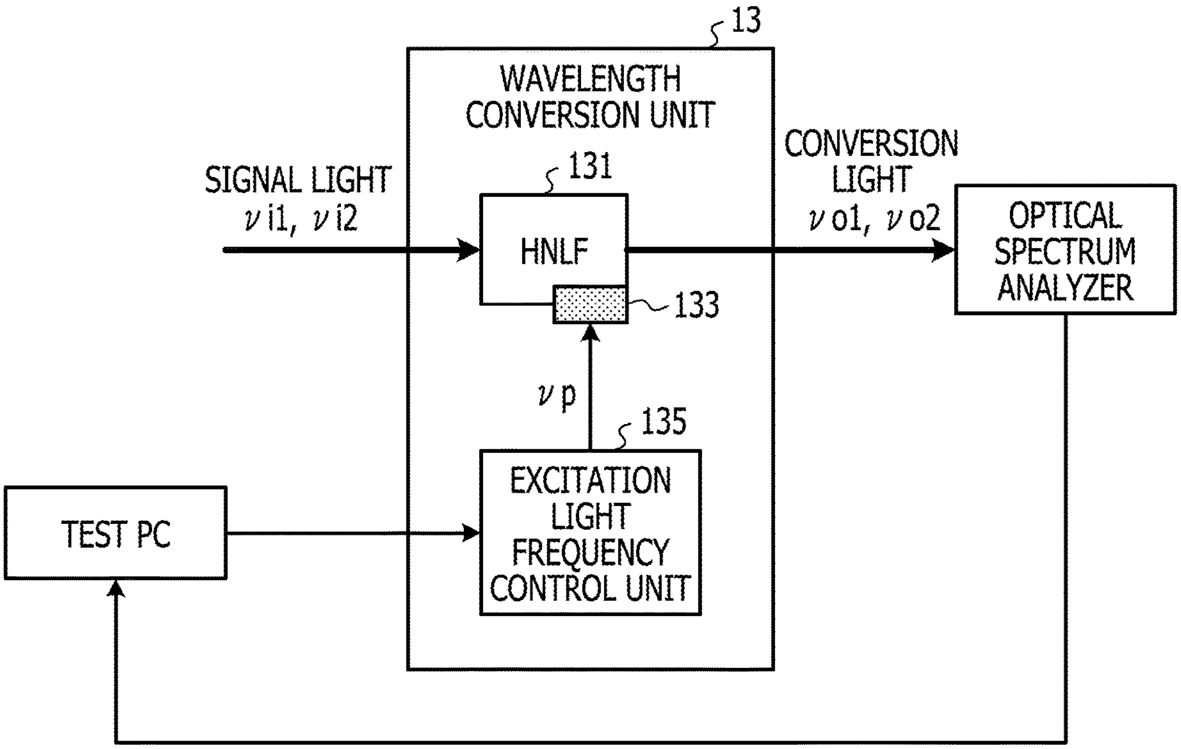
FIG. 11 is a diagram illustrating measurement of wavelength conversion characteristic information.

FIG. 11 is a diagram for explaining measurement of wavelength conversion characteristic information. A test personal computer (PC) is connected to the wavelength conversion unit 13. The excitation light frequency of the pump light source 133 of the wavelength converter 131 is swept through the excitation light frequency control unit 135. Signal light νi1 and νi2 is input to the wavelength converter 131, and is subjected to the wavelength conversion after combined with the excitation light. The outputs νo1 and νo2 of the wavelength converter 131 are monitored with an optical spectrum analyzer. The monitor result is recorded in the test PC in association with the excitation light frequency. The same measurement is also performed for the wavelength converter 132. The measurement result is recorded in the test PC.

Figure 12A:
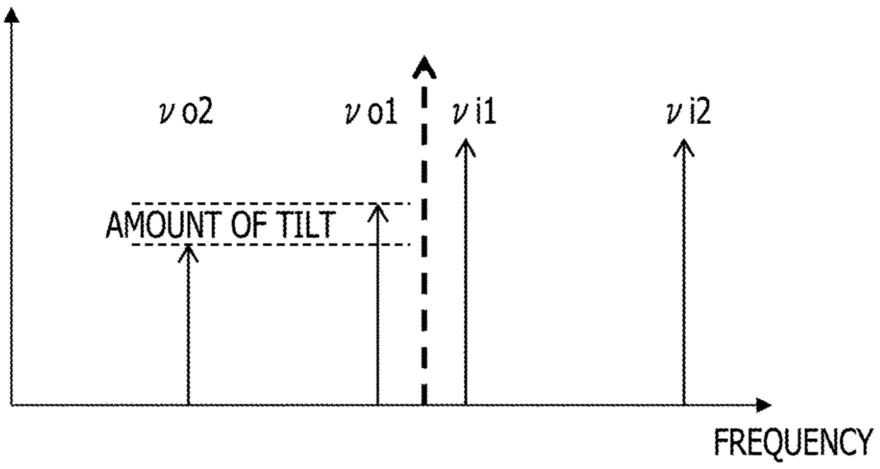
FIGS. 12A to 12C are diagram for explaining a change in the amount of tilt when the excitation light frequency is swept.
Figure 12B:
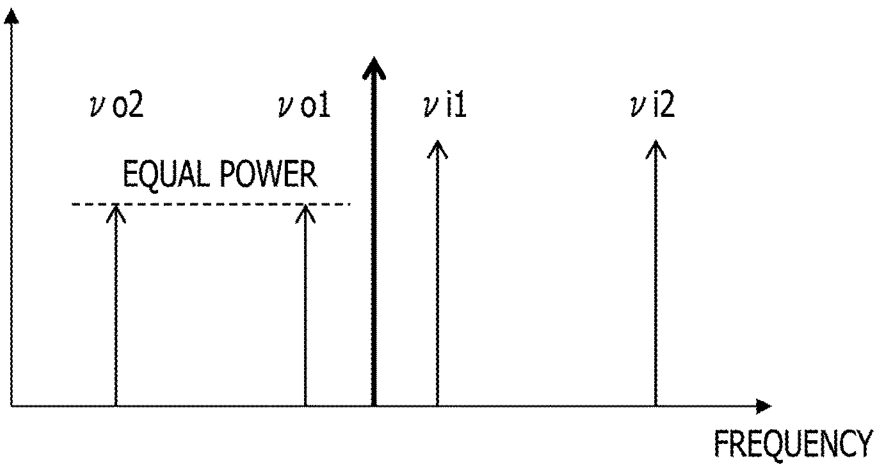
Figure 12C:
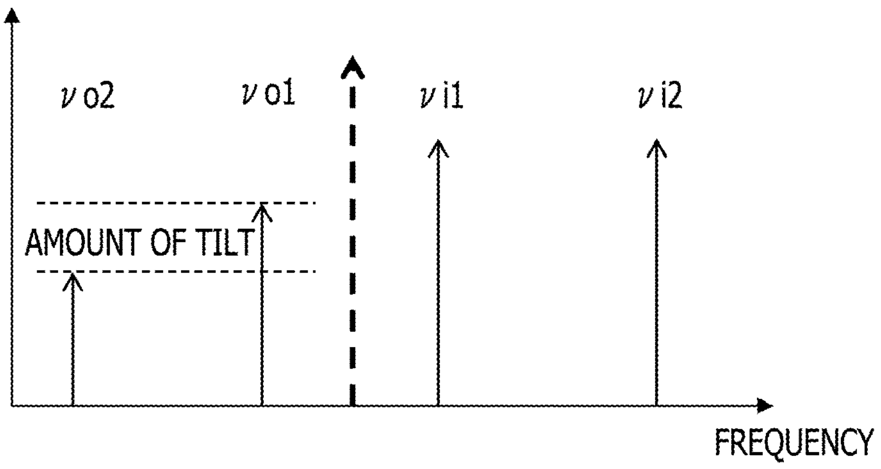

FIG. 12 is a diagram for explaining a change in the amount of tilt when the excitation light frequency is swept. The horizontal axis of each chart represents frequency and the vertical axis represents power. The upper part of FIG. 12 illustrates the output characteristic when the excitation light frequency is larger than the zero dispersion frequency. The broken line arrow at the center represents the excitation light. There is a difference in the powers of the output conversion light νo1 and νo2 with respect to the input signal light νi1 and νi2. The power of the conversion light νo2 having a frequency far from the excitation light frequency decreases. The difference between the powers of the conversion light νo1 and νo2 is taken as the amount of tilt.

The middle part of FIG. 12 illustrates the output characteristic when the excitation light frequency coincides with the zero dispersion frequency. The solid arrow at the center represents the zero dispersion frequency and the excitation light frequency. Conversion light νo1 and νo2 having the same power is output with respect to the input signal light νi1 and νi2. The TILT does not occur.

The lower part of FIG. 12 illustrates the output characteristic when the excitation light frequency is smaller than the zero dispersion frequency. The broken arrow at the center represents the excitation light. A difference in the powers of the output conversion light νo1 and νo2 with respect to the input signal light νi1 and νi2 respectively occurs. The power of the conversion light νo2 having a frequency far from the excitation light frequency greatly decreases. The amount of tilt observed is recorded as a function of the excitation light frequency.

Figure 13:
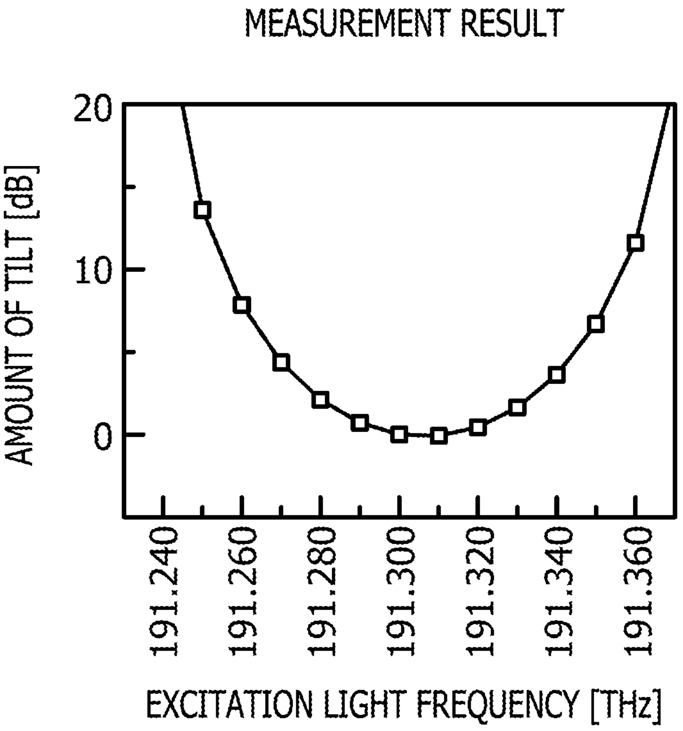
FIG. 13 is a diagram illustrating measurement results.

FIG. 13 is a diagram illustrating measurement results. The wavelength conversion characteristic curve of the wavelength converter 131 is obtained as a function of the excitation light frequency. This curve is approximated by the quadratic function $y=ax^2+bx+c$ by least squares method. The coefficients (a, b, c) are stored in the HNLF characteristic holding memory 136.

In the optical transmission apparatus 10B-2, the excitation light frequency νp2 is calculated as the value of x at which the amount of tilt y12 in the equation (4) is minimized, and the excitation light frequency νp3 is calculated as the value of x at which the amount of tilt y34 in the expression (4) is minimized.

$$y12=y1+y2=a1x^2+b1x+c1+a2x^2+b2x+c2$$

$$y34=y3+y4=a3x^2+b3x+c3+a4x^2+b4x+c4 \quad (4)$$

Figure 14:
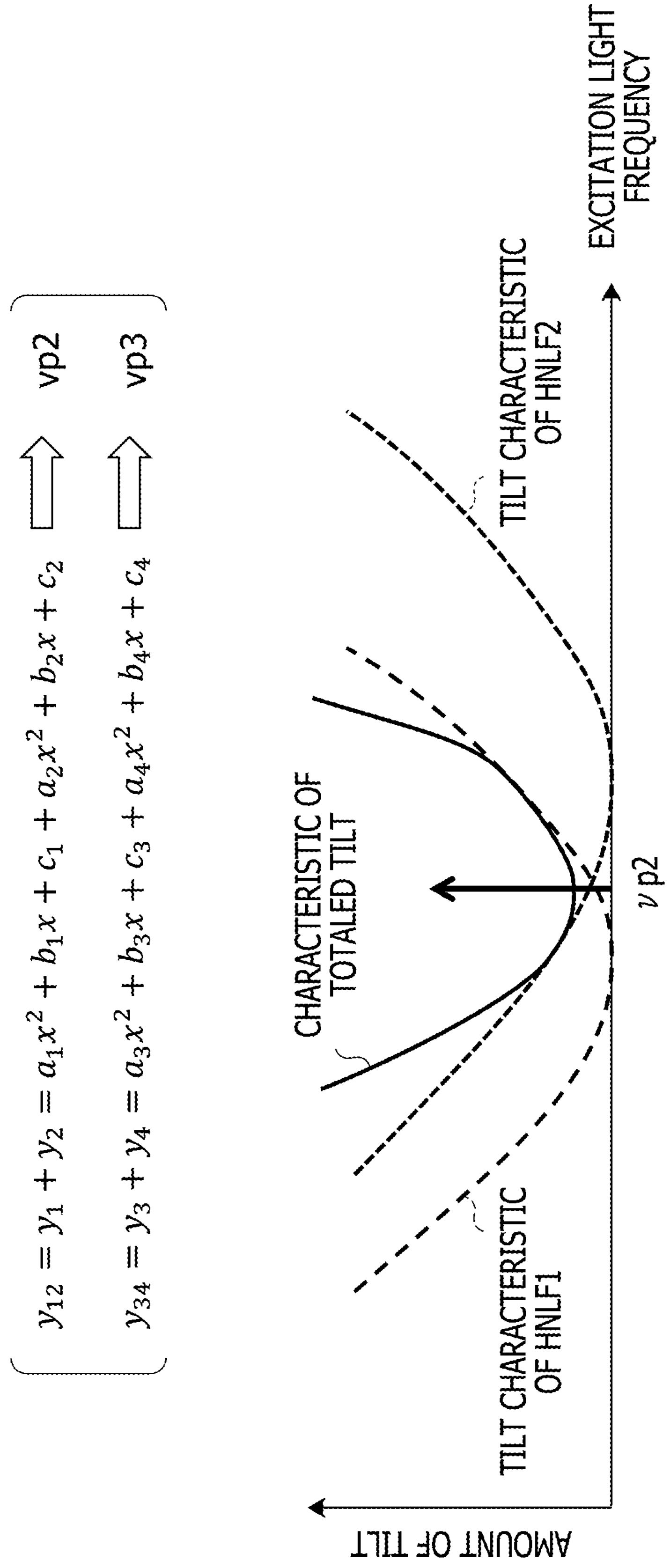
FIG. 14 is a diagram for explaining the effect of setting the excitation light frequency.

FIG. 14 is a diagram for explaining the effect of setting the excitation light frequency. The horizontal axis represents the excitation light frequency, and the vertical axis represents the amount of tilt. The curve of the tilt characteristic of the HNLF1 of the optical transmission apparatus 10A-2, and the curve of the tilt characteristic of the HNLF2 of the optical transmission apparatus 10B-2 are asymmetric with respect to the zero dispersion frequency at which the amount of tilt is minimized, and the degree of opening of the parabola (coefficient "a") is different. In this case, by having the coefficients (a, b, c) of the approximate curve, it is possible to express each wavelength conversion characteristic approximately.

The solid line in FIG. 14 represents the tilt characteristic y12 of the sum of the amount of tilt y1 of the HNLF1 and the amount of tilt y2 of the HNLF2. In the optical transmission apparatus 10B-2, the excitation light frequency νp2 at which the total amount of tilt is minimized between the optical transmission apparatus 10A-2 and the optical transmission apparatus 10B-2 is the optimum excitation light frequency for the wavelength converter 1328. In this case, the gain deviation of the main signal light having undergone the wavelength conversion twice is minimized.

In the wavelength converter 131B of the optical transmission apparatus 10B-2, the excitation light frequency νp3 at which the amount of tilt y34 of the sum of the amount of tilt y3 of the HNLF3 and the amount of tilt y4 of the HNLF4 are minimized, is determined as the optimum excitation light wave number.

Also in the optical transmission apparatus 10A-2, the excitation light frequency νp1 of the wavelength converter 131A and the excitation light frequency νp4 of the wavelength converter 132A are calculated according to the same procedure using the coefficient information received from the optical transmission apparatus 10B-2. As a result, νp1=νp2, νp4=νp3. The excitation light frequencies νp1 and νp4 are set to the pump light sources 133A and 134A respectively.

In the second embodiment, even if the shapes or degrees of opening (coefficient "a") of the characteristic curves of the HNLF1 and the HNLF2, or the HNLF4 and the HNLF3 are different, it is possible to select the excitation light wavelength at which the amount of tilt is minimized as long as the difference between the zero dispersion frequencies of the HNLF1 and the HNLF2 is small so as to be within the range where the quadratic function approximation holds.

In the optical transmission system 1-2 according to the second embodiment, the excitation light frequency is recalculated at the time of replacement of the failed supervisory control light transmitting unit 141 or the failed supervisory control light receiving unit 142 in addition to when the wavelength converter 131 or 132 is replaced, and when a new optical transmission apparatus 10 is introduced. The excitation light frequency is recalculated at the time of recovery from the interruption of the OSC signal, and at the time of recovery from disconnection of the optical transmission line 2 or 3. The fundamental flow of the wavelength conversion and transmission/reception of the optical signal after setting the excitation light frequency is the same as that of the optical transmission system 1-1 according to the first embodiment.

Also in the second embodiment, an excitation light frequency that is the same excitation light frequency between the optical transmission apparatus 10A-2 and the optical transmission apparatus 10B-2 and at which the tilt of the main signal light that has undergone the wavelength conversion twice between the optical transmission apparatus 10A-2 and the optical transmission apparatus 10B-2 is minimized is autonomously set. As a result, the main signal light may be received with uniform wavelength conversion efficiency within the ITU grid.

Third Embodiment

Figure 15:
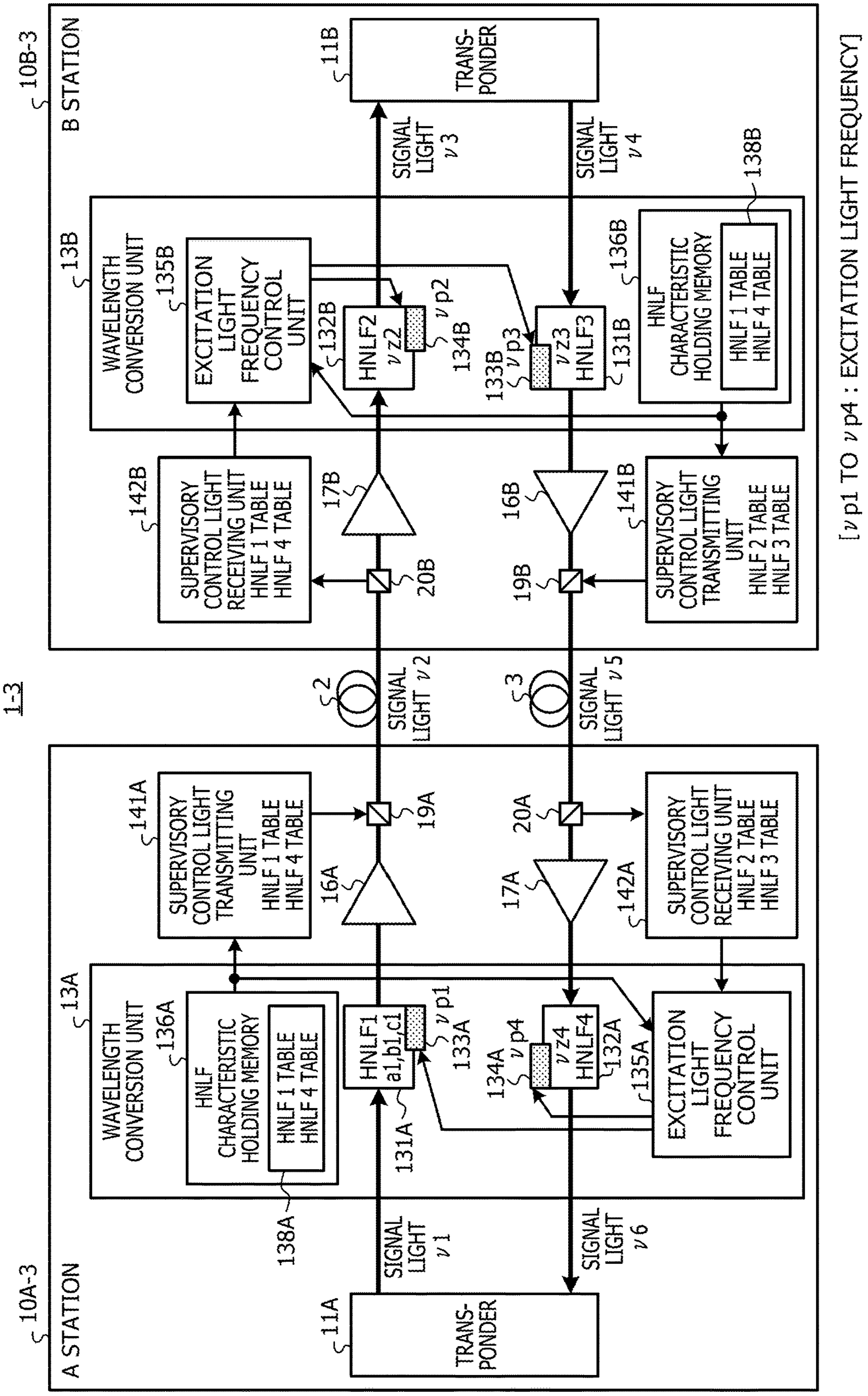
FIG. 15 is a schematic diagram of an optical transmission system according to a third embodiment.

FIG. 15 is a schematic diagram of an optical transmission system 1-3 according to a third embodiment. The optical transmission system 1-3 includes an optical transmission apparatus 10A-3 (A station) and an optical transmission apparatus 108B-3 (B station). The basic configuration of the optical transmission system 1-3 is the same as the basic configuration of the optical transmission system 1-1 according to the first embodiment and the basic configuration of the optical transmission system 1-2 according to the second embodiment. The features according to the third embodiment will be mainly described.

In the third embodiment, an HNLF characteristic table 138 describing the wavelength conversion characteristic of wavelength converters 131 and 132 of the own station is stored in HNLF characteristic holding memory 136. An HNLF characteristic table 138A of the optical transmission apparatus 10A-3 includes an HNLF1 table describing the wavelength conversion characteristic of the HNLF1, and an HNLF4 table describing the wavelength conversion characteristic of the HNLF4. An HNLF characteristic table 138B of the optical transmission apparatus 10B-3 includes an HNLF2 table describing the wavelength conversion characteristic of the HNLF2, and an HNLF3 table describing the wavelength conversion characteristic of the HNLF3.

As in the first embodiment and the second embodiment, the supervisory control light transmitting unit 141 and the supervisory control light receiving unit 142 are used as the HNLF characteristic communication interfaces 14 and 15. The information of the HNLF characteristic table 138 is transmitted and received between the optical transmission apparatus 10A-2 and the optical transmission apparatus 10B-2 using the optical supervisory channel (OSC).

FIG. 16 illustrates an example of an HNLF characteristic table 138A of the optical transmission apparatus 10A-3. The amount of tilt of the HNLF1 (dB) and the amount of tilt of the HNFL4 (dB) are described in association with the excitation light frequency. The HNLF1 table is formed by the excitation light frequency and the amount of tilt of the HNLF1, and the HNLF4 table is formed by the excitation light frequency and the amount of tilt of the HNLF4.

The HNLF characteristic table 1388 of the optical transmission apparatus 10B-3 describes the amount of tilt of the HNLF2 and the amount of tilt of the HNFL3 in association with the excitation light frequency. The HNLF tables 138A and 138B indicates the actual wavelength conversion characteristic more accurately than the approximate curve by fitting. As in the second embodiment, the table information is obtained by sweeping the excitation light frequency and measuring individual characteristics when manufacturing the wavelength converters 131 and 132.

The table information output from the supervisory control light transmitting unit 141A of the optical transmission apparatus 10A-3 (HNLF1 table, HNFL4 table) is output to the same output port as that of the signal light through the WDM coupler 19, and is sent out to the optical transmission line 2. The table information of the optical transmission apparatus 10A-3 is received by the supervisory control light receiving unit 1428 of an optical transmission apparatus 10B-3, and is supplied to the excitation light frequency control unit 135B. The excitation light frequency control unit 1358 reads table information of the own station (HNLF2 table, HNLF3 table) from the HNLF characteristic holding memory 1368. The excitation light frequency control unit 135B calculates and sets the excitation light frequency νp3 of the pump light source 1338, and the excitation light frequency νp2 of the pump light source 134B using the table information.

The table information output from the supervisory control light transmitting unit 141B of the optical transmission apparatus 10B-2 (HNLF2 table, HNLF3 table) is transmitted from the WDM coupler 19 to the optical transmission line 3, and received by the supervisory control light receiving unit 142A of the optical transmission apparatus 10A-2. The table information is supplied to the excitation light frequency control unit 135A. The excitation light frequency control unit 135A reads the table information of the own station from the HNLF characteristic holding memory 136A, and calculates and sets the excitation light frequency νp1 of the pump light source 133A, and the excitation light frequency νp4 of the pump light source 134A.

FIG. 17 is a diagram for explaining a method of determining the excitation light frequency performed in the optical transmission apparatus 10B-3. Upon receiving the table information from the optical transmission apparatus 10A-3, the optical transmission apparatus 10B-3 calculates the total amount of tilt for each excitation frequency using the received HNFL1 table and the HNFL2 table of the own station. The excitation light frequency (191.300 THz) at which the total amount of tilt is minimized is selected as the excitation light frequency νp2 of the pump light source 1348. This processing corresponds to the determination of the excitation light frequency x at which the amount of tilt y12 of the expression (4) is minimized in the second embodiment.

The optical transmission apparatus 10B-3 calculates the total amount of tilt for each excitation frequency using the received HNFL4 table and the HNFL3 table of the own station, and selects as the excitation light frequency νp3 of the pump light source 133B the excitation light frequency at which the total amount of tilt is minimized. This processing corresponds to the determination of the excitation light frequency x at which the amount of tilt y34 in the expression (4) is minimized.

Also in the optical transmission apparatus 10A-3, the excitation light frequency νp1 of the wavelength converter 131A and the excitation light frequency νp4 of the wavelength converter 132A are calculated according to the same procedure using the table information received from the optical transmission apparatus 10B-3. In this case, the values of νp1=νp2 and νp4=νp3 are calculated, and the frequencies νp1 and νp4 are set to the pump light sources 133A and 134A respectively.

Figure 18:
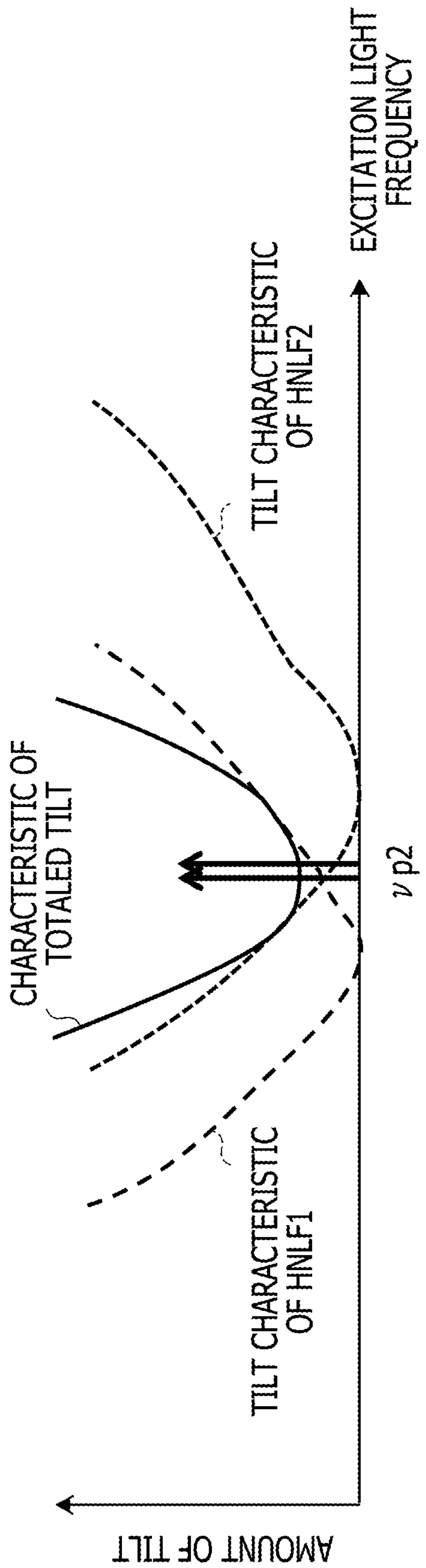
FIG. 18 is a diagram for explaining the effect of setting the excitation light frequency.

FIG. 18 is a diagram for explaining the effect of setting the excitation light frequency. In the third embodiment, since for the wavelength conversion characteristic, actual measurement value data is used without performing fitting, the characteristic curve of the HNLF1 and the characteristic curve of the HNLF4 are distorted. The solid curve indicates the characteristic of the totaled tilt. The frequency at which the total amount of tilt is minimized is selected as the excitation light frequency νp2 of the pump light source 134B. In the wavelength converter 131B, the excitation light frequency νp3 at which the total amount of tilt is minimized is selected and set. In the optical transmission apparatus 10A-3, the same excitation light wavelength as that of the optical transmission apparatus 10B-3 is set by the same procedure.

The method of FIG. 18 is used effectively when the error of quadratic function approximation is large, or when the difference between the zero dispersion frequencies of the HNLF1 and the HNLF2 is large. In this method, an excitation light frequency that is the same excitation light frequency between the optical transmission apparatus 10A-3 and the optical transmission apparatus 10B-3 and at which the tilt of the main signal light that has undergone the wavelength conversion twice between the optical transmission apparatus 10A-3 and the optical transmission apparatus 10B-3 is minimized is autonomously set, and it is possible to receive the main signal light with uniform wavelength conversion efficiency within the ITU grid.

In the optical transmission system 1-3 according to the third embodiment, the excitation light frequency is recalculated at the time of replacement of the failed supervisory control light transmitting unit 141 or the failed supervisory control light receiving unit 142 in addition to when the wavelength converter 131 or 132 is replaced, and when a new optical transmission apparatus 10 is introduced. The excitation light frequency is recalculated at the time of recovery from the interruption of the OSC signal, and at the time of recovery from disconnection of the optical transmission line 2 or 3. The fundamental flow of the wavelength conversion and transmission/reception of the optical signal after setting the excitation light frequency is the same as that of the optical transmission system 1-1 according to the first embodiment.

Fourth Embodiment

Figure 19:
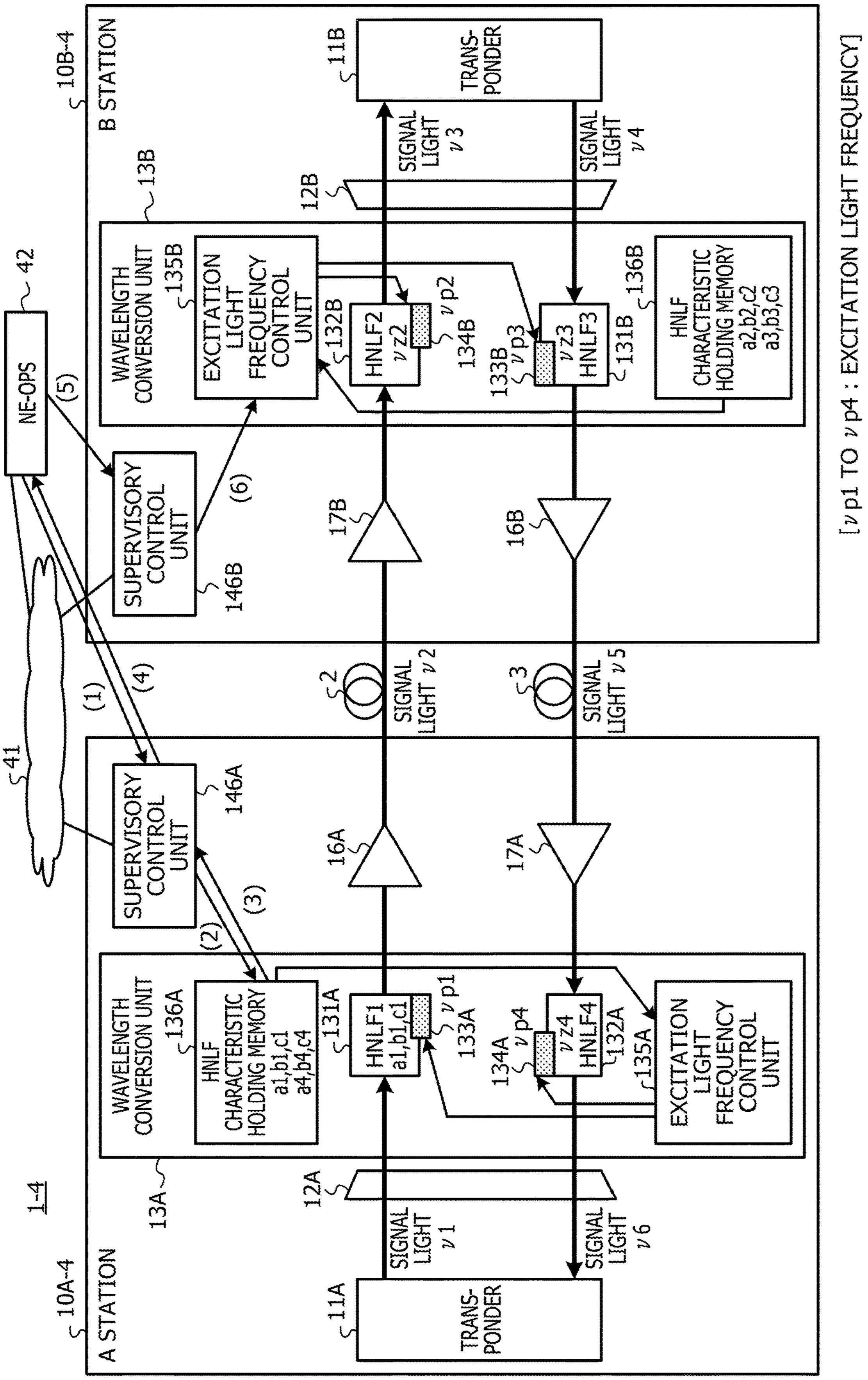
FIG. 19 is a schematic diagram of an optical transmission system according to a fourth embodiment.

FIG. 19 is a schematic diagram of an optical transmission system 1-4 according to the fourth embodiment. The optical transmission system 1-4 includes an optical transmission apparatus 10A-4 (A station), and an optical transmission apparatus 10B-4 (B station). The basic configuration of the optical transmission system 1-4 is the same as the basic configuration of the optical transmission system 1-2 according to the second embodiment. The features according to the fourth embodiment will be mainly described.

In the fourth embodiment, a supervisory control unit 146 connected to a supervisory control network 41 and a network element operation system (NE-OPS) 42 is used as the HNLF characteristic communication interfaces 14 and 15. The supervisory control unit 146 is implemented by, for example, a CPU and a network interface. Information on the wavelength conversion characteristic is transmitted and received between the optical transmission apparatus 10A-4 and the optical transmission apparatus 10B-4 by the NE-OPS 42.

In the example of FIG. 19, the optical transmission apparatus 10A-4 and the optical transmission apparatus 10B-4 hold a set of coefficients (a, b, c) of a quadratic approximate curve as the wavelength conversion characteristic, but they are not limited to this example. As in the first embodiment, the zero dispersion frequency of the wavelength converters 131 and 132 may be held. As in the third embodiment, the HNLF table may be held.

The NE-OPS 42 reads requested wavelength conversion characteristic values via the supervisory control network 41 to transfer it to a target optical transmission apparatus 10-4. The procedure of transferring the wavelength conversion characteristic information from the optical transmission apparatus 10A-4 to the optical transmission apparatus 108B-4 is as follows.

(1) The NE-OPS 42 transmits a request for reading the HNLF characteristic to a supervisory control unit 146A of the optical transmission apparatus 10A-4.

(2) The supervisory control unit 146A transfers the request for reading the HNLF characteristic to the wavelength conversion unit 13A.

(3) The wavelength conversion unit 13A reads the HNLF characteristic value from the HNLF characteristic holding memory 136A, and supplies the read value to the supervisory control unit 146A.

(4) The supervisory control unit 146A of the optical transmission apparatus 10A-4 transmits the HNLF characteristic value to the NE-OPS 42.

(5) The NE-OPS 42 transmits the HNLF characteristic value received from the optical transmission apparatus 10A-4 to a supervisory control unit 1468 of the optical transmission apparatus 10B-4.

(6) The supervisory control unit 146B supplies the received HNLF characteristic value of the optical transmission apparatus 10A-4 to the excitation light frequency control unit 135B.

(7) The excitation light frequency control unit 135B calculates and sets the excitation light frequencies νp2 and νp3 at which the total amount of tilt is minimized between the opposed optical transmission apparatuses using the HNLF characteristic value of the optical transmission apparatus 10A-4 and the HNLF characteristic value stored in the HNLF characteristic holding memory 136B of the own station.

Transfer of the HNLF characteristic value from the optical transmission apparatus 10B-4 to the optical transmission apparatus 10A-4, and calculation of the excitation light frequencies νp1 and νp4 in the optical transmission apparatus 10A-4 are also performed in the same manner. For HNLF characteristic information, when zero dispersion frequency or table information is transferred, the excitation light wavelength at which the tilt of the main signal light having undergone the wavelength conversion twice is minimized is calculated by the method described in the first embodiment and the third embodiment.

In the optical transmission system 1-4 according to the fourth embodiment, the excitation light frequency is recalculated when the optical transmission apparatus 10 performing the wavelength conversion is not monitored and thereafter restored, and when the wavelength conversion unit 13 is not monitored and thereafter restored in addition to when the wavelength converter 131 or 132 is replaced, and when a new optical transmission apparatus is introduced. "is not monitored" means that the control operation of the optical transmission apparatus 10 is not seen from the NE-OPS 42 due to a failure of the supervisory control unit 146, the control operation of some groups is invisible from the NE-OPS 42 when switching the groups on which wavelength multiplexing of signals of a plurality of transponders are performed to perform the wavelength conversion, or the like.

The excitation light frequency is recalculated at the time of recovery from disconnection of the optical transmission line 2 or 3. The fundamental flow of the wavelength conversion and transmission/reception of the optical signal after setting the excitation light frequency is the same as that of the optical transmission system 1-1 according to the first embodiment.

Fifth Embodiment

Figure 20:
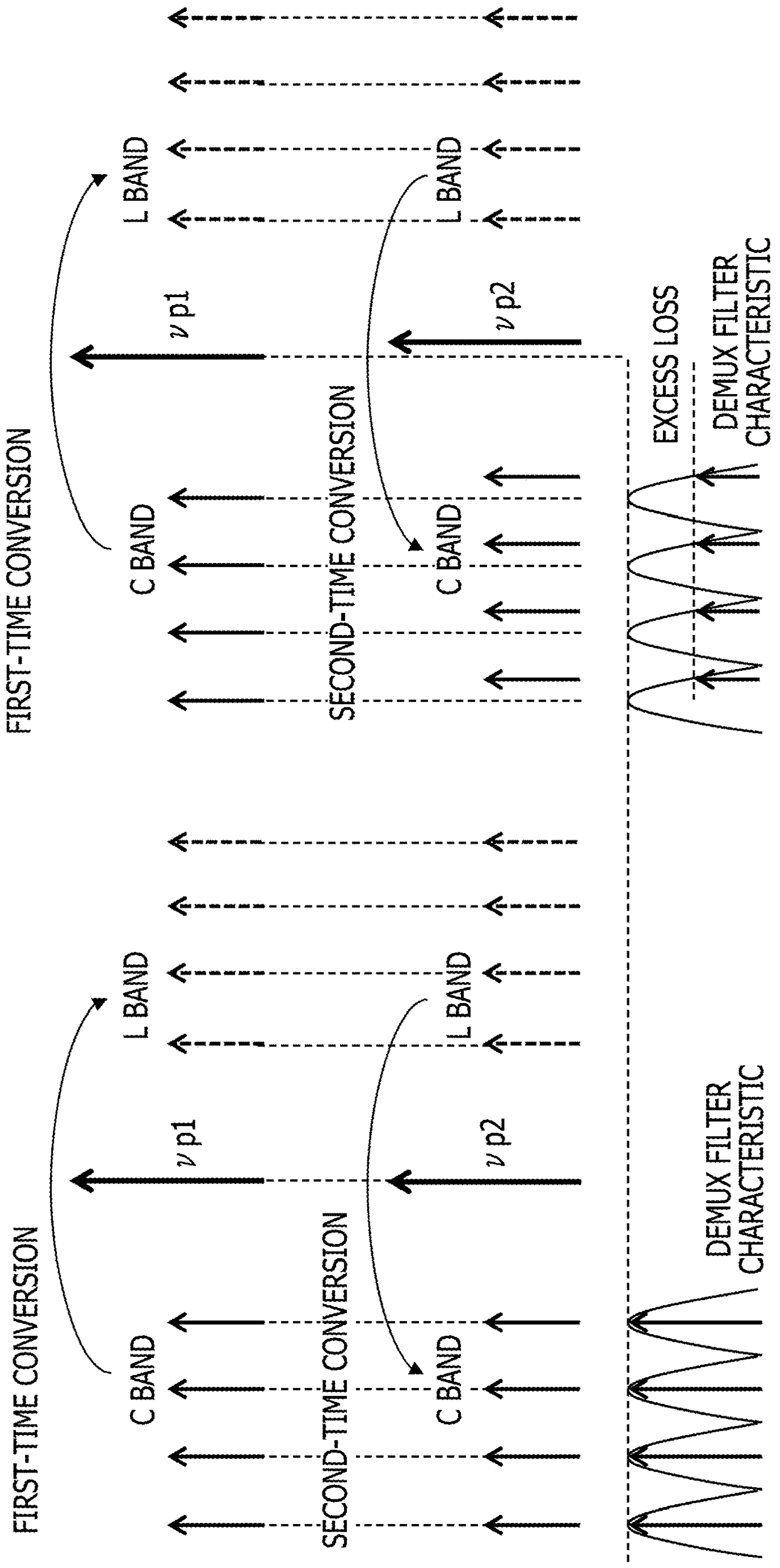
FIG. 20 is a diagram for explaining setting of an excitation light frequency according to a fifth embodiment.

FIG. 20 is a diagram for explaining a method of setting an optimum excitation light frequency according to a fifth embodiment. In the first to fourth embodiments, the excitation light frequency between the optical transmission apparatus 10A and the optical transmission apparatus 10B on the reception side is set to be the same.

In practical communication, even if the excitation light frequency on the transmission side and the excitation light frequency on the reception side do not completely coincide with each other, it is possible to receive the WDM signal in the ITU grid as long as the frequency difference is within the allowable range, and the loss at the time of demultiplexing is small.

The left diagram of FIG. 20 illustrates a schematic diagram when the excitation light frequencies on the transmission side and the reception side coincide with each other. The right diagram of FIG. 20 illustrates a schematic diagram when excitation light frequencies on the transmission side and the reception side are different from each other.

In the left figure, the excitation light frequency νp1 on the transmission side (for example, the optical transmission apparatus 10A) and the excitation light frequency νp2 on the reception side (for example, the optical transmission apparatus 10B) coincide with each other. In this case, when performing the second-time collective conversion (for example, conversion from the L band to the C band) on the reception side is performed after the first-time collective conversion (for example, conversion from the C band to the L band) on the transmission side is performed, it is possible to return the wavelength after conversion to substantially the same wavelength as the wavelength before conversion. Loss of light hardly occurs in each wavelength signal extracted by the DEMUX filter on the reception side.

In the right figure, when the excitation light frequency νp1 of the transmission side and the excitation light frequency νp2 on the reception side are deviated, excessive loss occurs in each wavelength signal extracted by the DEMUX filter after the second-time collective conversion. This light loss is caused by the frequency deviation between νp1 and νp2.

When the frequency deviation between νp1 and νp2 is within an allowable range, the offset of the wavelength signal extracted after the second-time conversion from the original signal is small, whereby sufficient optical power may be obtained.

Figure 21:
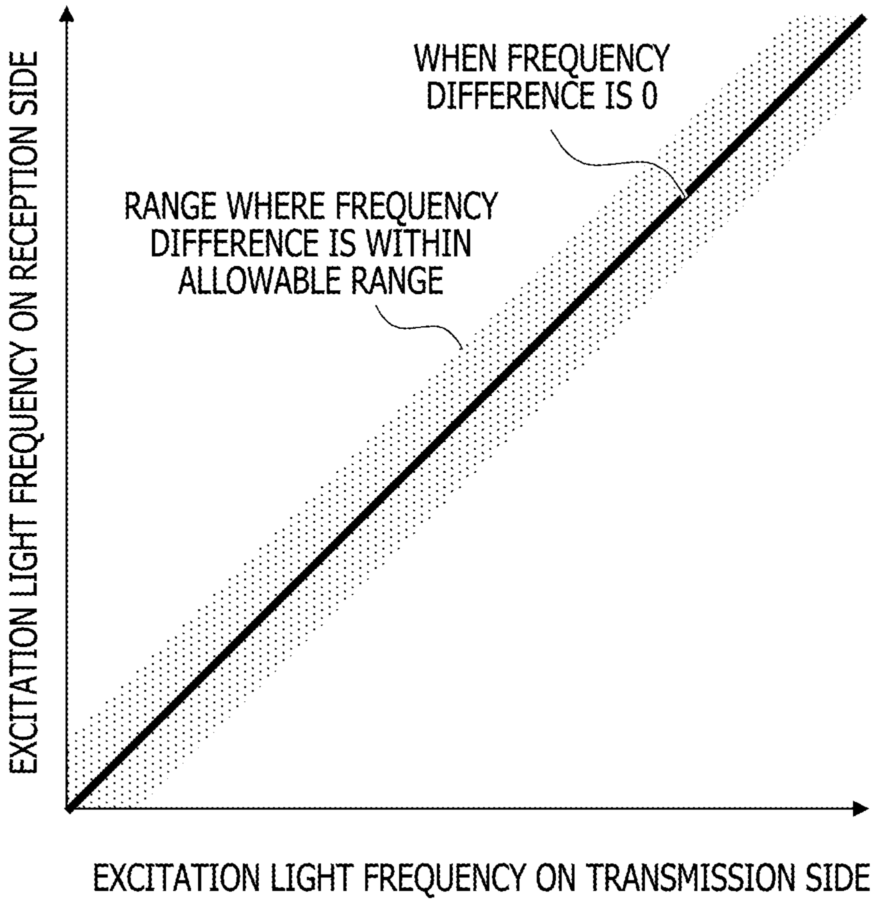
FIG. 21 is a diagram for explaining setting of an excitation light frequency with a frequency difference within an allowable range.

FIG. 21 is a diagram for explaining the setting of an excitation light wavelength with a frequency difference within an allowable range. When the horizontal axis represents the excitation light frequency on the transmission side and the vertical axis represents the excitation light frequency on the reception side, the solid line extending in the direction of 45° from the origin represents the line indicating that the frequency difference is zero, for example, the line at which the excitation light frequencies on the transmission side and the reception side coincide with each other.

The gray area including the solid line is an area where the frequency difference is within the allowable range. Within the gray area, even if the excitation light frequencies on the transmission side and the reception side slightly deviates, the loss of the optical power is small (within the allowable range), whereby it is possible to correctly demodulate each received wavelength signal. Therefore, in the gray area, the excitation light frequency at which the total amount of tilt is minimized is searched for.

FIG. 22 is a diagram for explaining the setting of an optimum excitation light frequency with a frequency difference within an allowable range. By the method of the second embodiment (acquiring the coefficient information of the approximate curve) or the method of the third embodiment (acquiring the table information), the amount of tilts of the transmission side and the reception side is acquired, and the total amount of tilt for each excitation light frequency is calculated.

In FIG. 22, the leftmost column represents the excitation light frequency on the transmission side, and the uppermost row represents the excitation light frequency on the reception side. A cell where two excitation light frequencies intersect represents the total amount of tilt at the excitation light frequency. For reference, the amount of tilt occurring on the reception side is illustrated outside of the right column. The amount of tilt occurring on the transmission side is illustrated outside of the lower row. The numbers in the table are the sum of the amount of tilt on the reception side and the amount of tilt on the transmission side.

In FIG. 22, an unshaded white area is an area where the frequency difference is within an allowable range. In this white area, a combination at which the total amount of tilt is minimized is selected. In the example of FIG. 22, when the excitation light frequency on the transmission side is 191.32 THz, and the excitation light frequency of the reception side is 191.30 THz, the total amount of tilt is minimized.

The selected excitation light frequency is set on the transmission side and the reception side. The calculation of FIG. 22 is performed for each of the optical transmission apparatus 10A and the optical transmission apparatus 10B after the wavelength conversion characteristic information is exchanged between the optical transmission apparatus 10A on the transmission side and the optical transmission apparatus 10B on the reception side. For example, an excitation light frequency control unit 133 of the wavelength conversion unit 13 of each optical transmission apparatus 10 performs the calculation (see FIGS. 10 and 15). The wavelength conversion unit 13 of each optical transmission apparatus 10 may select the excitation light frequency of the own station at which the total amount of tilt is minimized and may also recognize the excitation light frequency of the partner station.

By setting the allowable range of the frequency difference, a small amount of tilt may be achieved, compared with the case where the excitation light frequency on the transmission side and the reception side which coincide with each other is selected. Cells where the excitation light frequencies on the transmission side and the reception side coincide with each other are arranged on an oblique line from the upper left to the lower right in FIG. 22. The minimum amount of tilt on this line is the value "1" when the excitation light frequency is 191.31 THz on both the transmission side and the reception side.

On the other hand, the minimum amount of tilt selected within the allowable range is "0.3". The wavelength conversion is implemented with a smaller amount of tilt. In the fifth embodiment, a predetermined allowable range is set with respect to a difference between excitation light frequencies on the reception side and the transmission side is set, whereby it is possible to autonomously set a combination of optimum excitation light frequencies at which the total amount of tilt is minimized.

Modification

Figure 23A:
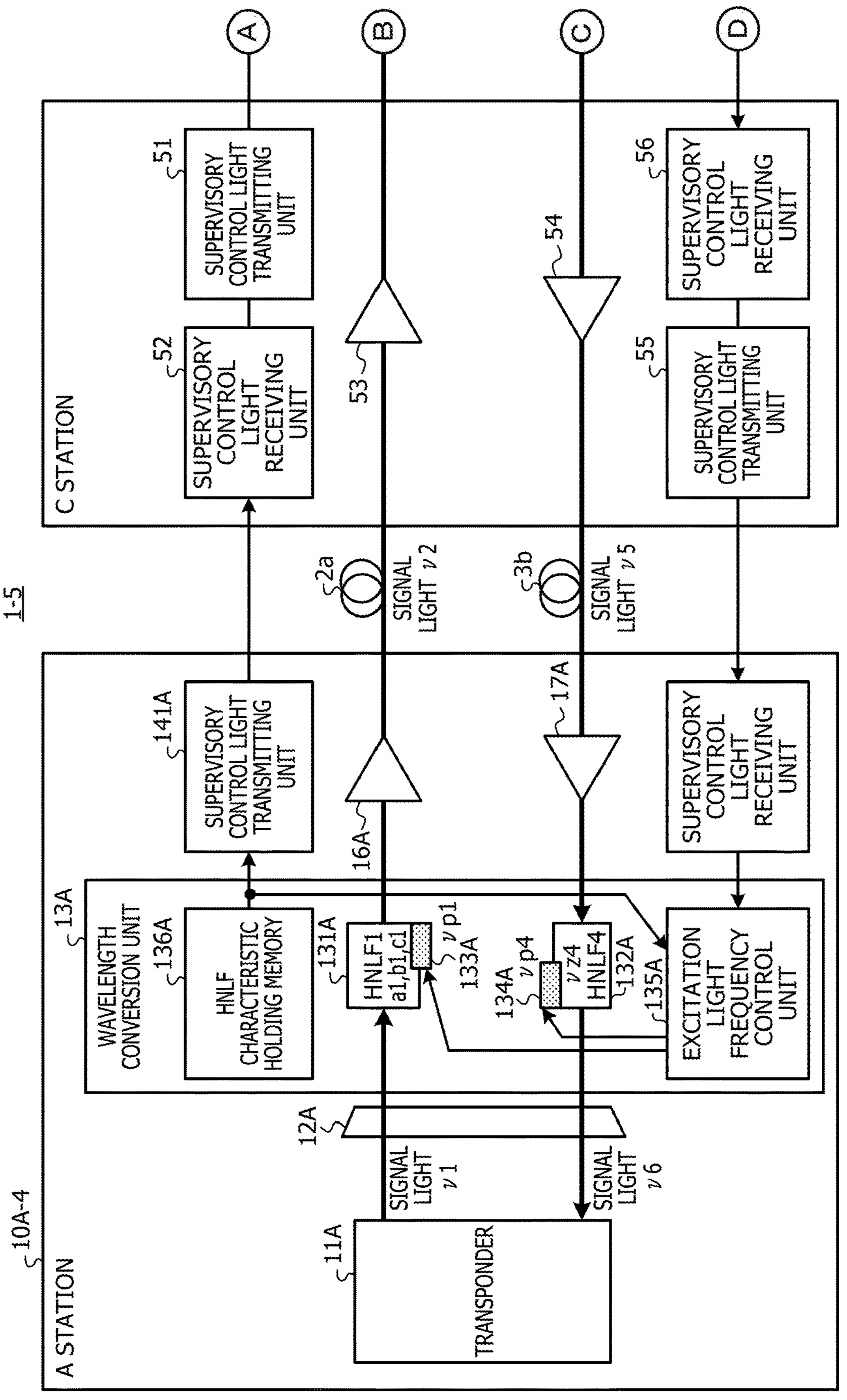
FIGS. 23A and 23B are schematic diagrams of a modification of the optical transmission system.
Figure 23B:
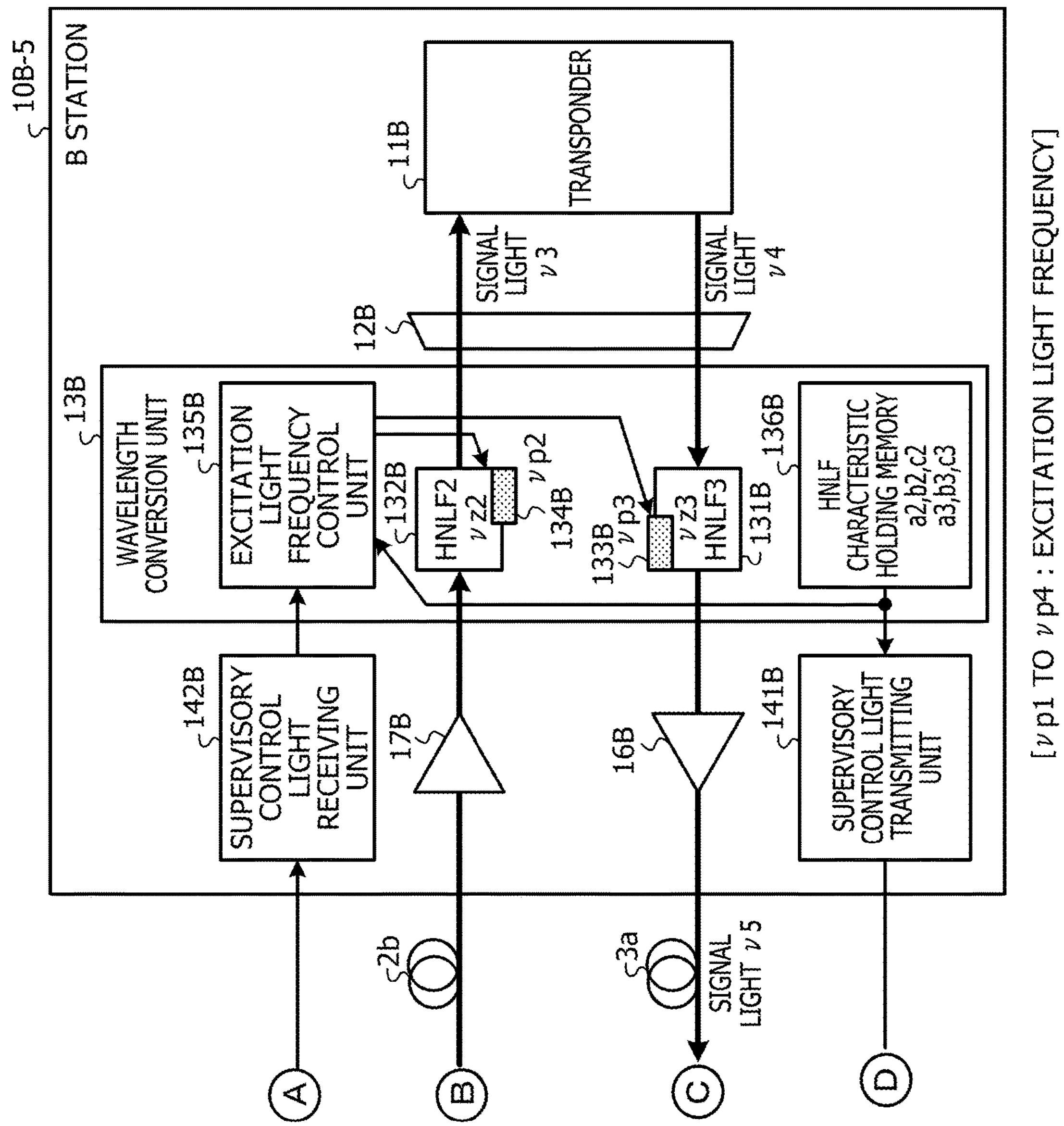

FIGS. 23A and 23B are schematic diagrams of an optical transmission system 1-5 according to a modification. The optical transmission system 1 according to the embodiment is also applied to an optical network in which the optical transmission apparatus 10 are connected with each other via a relay station.

The optical transmission system 1-5 includes an optical transmission apparatus 10A-5 (A station), an optical transmission apparatus 10B-5 (B station), and a relay station 50 (C station) that relays between them. The optical transmission apparatus 10A-5 and the relay station 50 are connected with each other through optical transmission lines 2*a* and 3*b*. The relay station 50 and the optical transmission apparatus 10B-5 are connected with each other through optical transmission lines 2*b* and 3*a*.

The HNLF characteristic information stored in the HNLF characteristic holding memory 136 of each optical transmission apparatus 10 is transmitted and received by the supervisory control light transmitting unit 141 and the supervisory control light receiving unit 142, which are HNLF characteristic communication interfaces, using the OSC.

When transferring HNLF characteristic with supervisory control light, the relay station 50, which does not perform the wavelength conversion, has a unit that transfers HNLF characteristic information to the next-stage optical transmission apparatus 10.

The relay station 50 includes supervisory control light transmitting units 51 and 55, and supervisory control light receiving units 52 and 56. When HNLF characteristic information is transmitted from the optical transmission apparatus 10A-5 to the optical transmission apparatus 10B-5, the relay station 50 receives the HNLF characteristic information at the supervisory control light receiving unit 52, and transfers the HNLF characteristic information at the supervisory control light transmitting unit 51. When HNLF characteristic information is transmitted from the optical transmission apparatus 10B-5 to the optical transmission apparatus 10A-5, the relay station 50 receives the HNLF characteristic information at the supervisory control light receiving unit 56, and transfers the HNLF characteristic information at a supervisory control light transmitting unit 55.

The supervisory control light transmitting units 51 and 55, and the supervisory control light receiving units 52 and 56 may be implemented using one OSC card or one OSC module.

The client signal is wavelength-converted from the signal light ν1 to the signal light ν2 by the optical transmission apparatus 10A-5, and is output to the optical transmission line 2*a*. The signal light ν2 is amplified by an optical amplifier 53 of the relay station 50 and transferred to the optical transmission apparatus 10B-5. The optical transmission apparatus 10B-5 wavelength-converts the received signal light ν2 into the signal light ν3 of the original wavelength, and outputs it to the transponder 118.

The client signal is wavelength-converted from the signal light ν4 to the signal light ν5 by the optical transmission apparatus 10B-5, and is output to the optical transmission line 3*a*. The signal light ν5 is amplified by an optical amplifier 54 of the relay station 50, and transferred to the optical transmission apparatus 10A-5. The optical transmission apparatus 10A-5 wavelength-converts the received signal light ν5 into the signal light ν6 of the original wavelength, and outputs it to the transponder 11A.

In the optical transmission system 1-5 in FIGS. 23A and 23B, the excitation light frequency is recalculated at the time of recovery from the optical transmission line disconnection in the relay section in addition to when the wavelength converter 131 or 132 is replaced, and when a new optical transmission apparatus 10 is introduced. The excitation light frequency is recalculated at the time of replacement of the failed supervisory control light transmitting unit 141 or the failed supervisory control light receiving unit 142, and at the time of recovery from the interruption of the OSC signal.

The configuration of FIG. 23 is effectively used, for example, for long-distance optical communication.

Figure 24A:
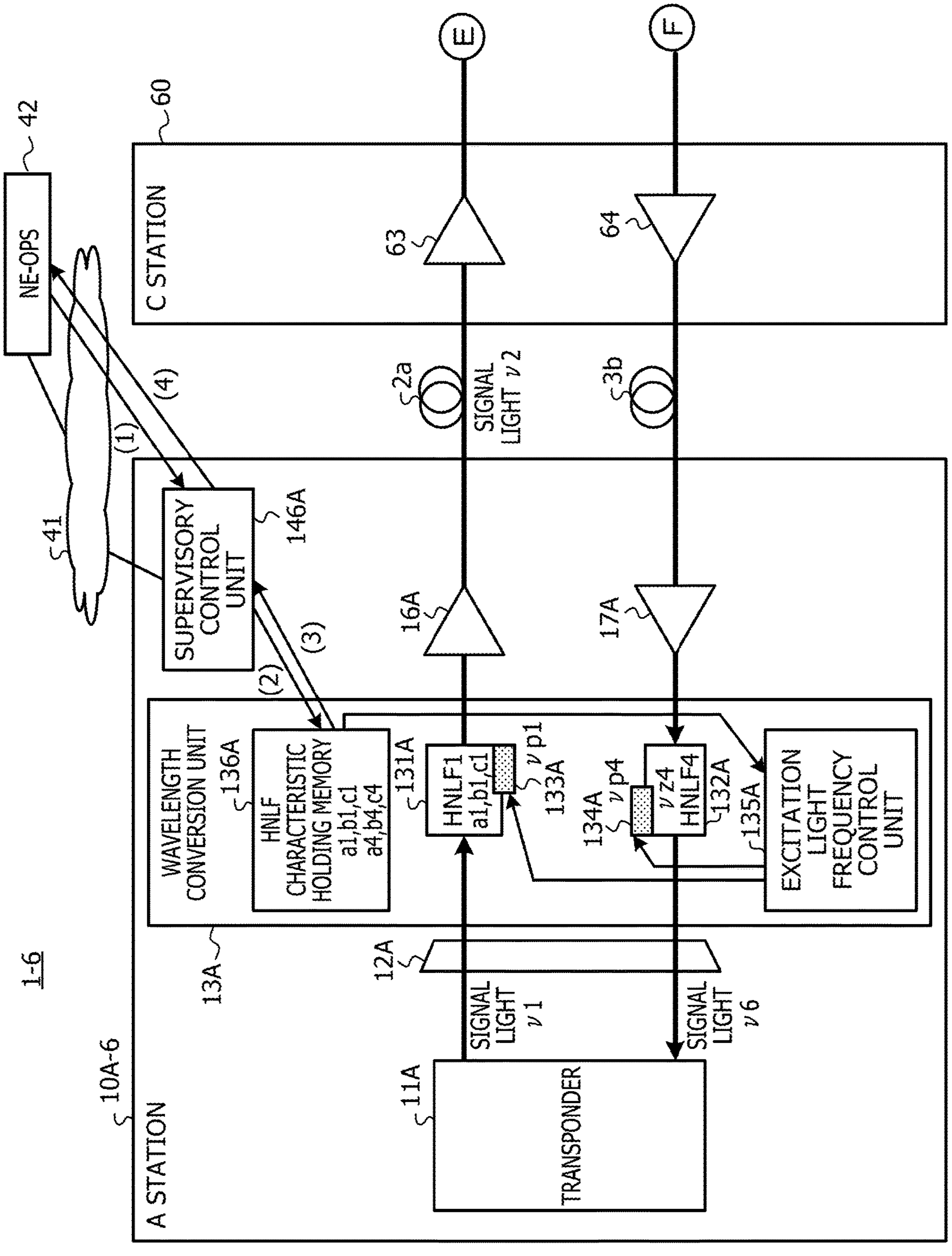
FIGS. 24A and 24B are schematic diagrams of another modification of the optical transmission system.
Figure 24B:
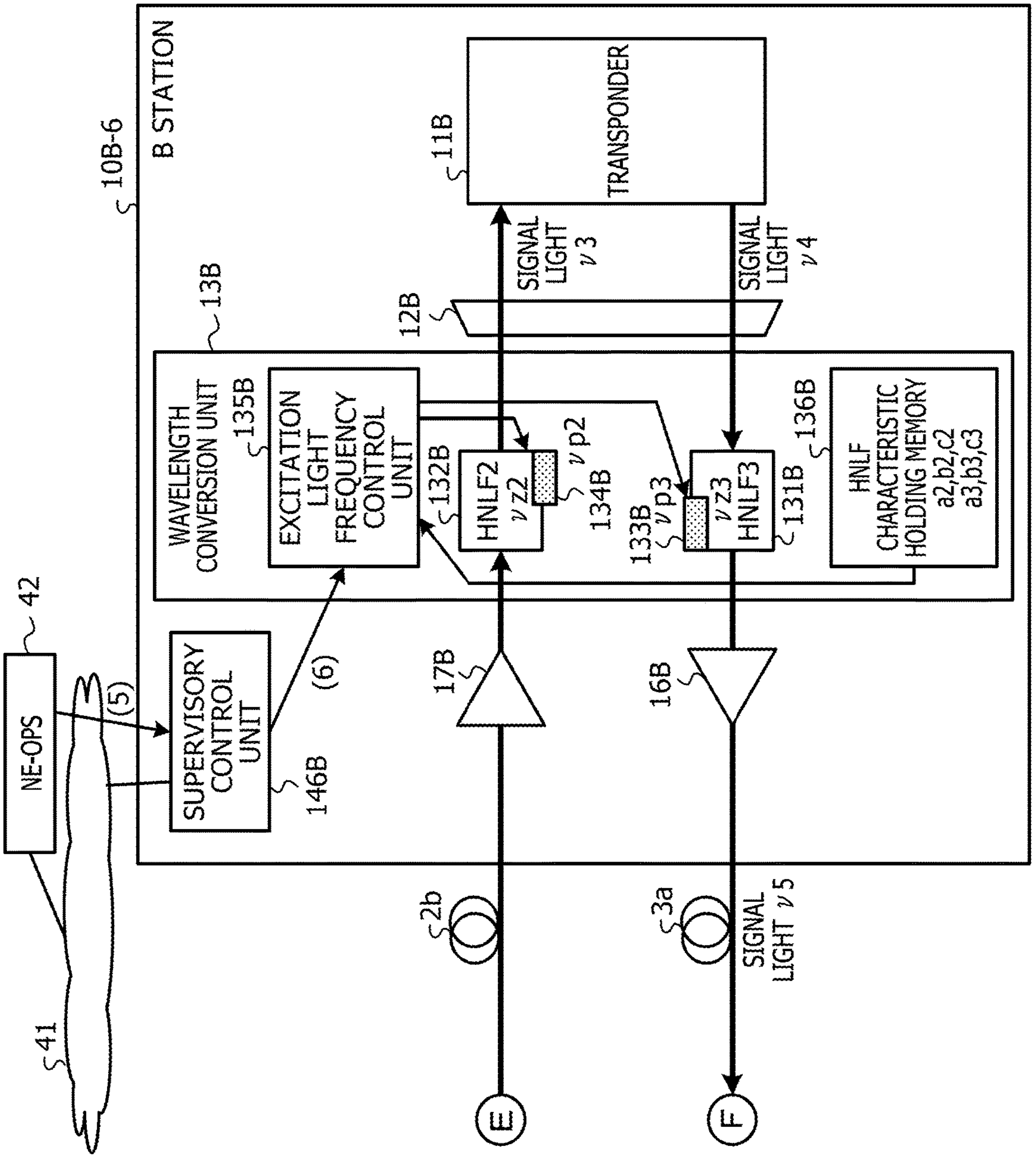

FIGS. 24A and 24B illustrate an optical transmission system 1-6 as another modification. In the optical transmission system 1-6, transfer of the main signal light using an relay station 60, and transfer of HNLF characteristic information using NE-OPS 42 are combined. In this example, the relay station 60 may not transfer the HNLF characteristic information, and the main signal light is amplified and transferred by the optical amplifiers 63 and 64.

The transmission and reception of the HNLF characteristic information between an optical transmission apparatus 10A-6 and an optical transmission apparatus 10B-6 is performed according to the procedure described in the fourth embodiment. The information held in the HNLF characteristic holding memory 136 of the optical transmission apparatus 10-6 may be the zero dispersion wavelength of the wavelength converters 131 and 132, a coefficient of an approximate curve representing the wavelength conversion characteristic, or a table in which the excitation frequency and the amount of tilt are associated with each other.

In any configuration example, the characteristic information of the wavelength converter is exchanged between the adjacent optical transmission apparatuses 10, and the excitation light frequency at which the gain deviation of the main signal light after performing the wavelength conversion twice is minimized is calculated using wavelength conversion characteristic information of the own station and wavelength conversion characteristic information of the partner station.

Although the present embodiments have been described using specific configuration examples, the present embodiments are not limited to the above-described examples, and includes various modifications without departing from the subject matter of the embodiments. Among the above-described embodiments, two or more embodiments may be combined. For example, zero dispersion frequency or table information may be acquired using the HNLF characteristic acquisition method used in the second embodiment in the first embodiment and the third embodiment.

The wavelength conversion configuration according to the embodiment may also be applied to an optical relay node. For example, in the configuration of FIGS. 23A and 23B, the wavelength conversion unit 13 is provided in the relay station 50, and HNLF characteristic information may be exchanged between the relay station 50 and the optical transmission apparatus 10A-5, and between the relay station 50 and the optical transmission apparatus 10B-5 to set the optimum excitation light frequency. Collective wavelength conversions at the optical relay node make it possible to avoid collision of wavelength.

The wavelength converter is not limited to a wavelength converter using HNLF, but may be a wavelength converter using a nonlinear optical crystal such as LiNbO3 (lithium niobate). Also in this case, the conversion characteristic of the nonlinear optical crystal (refractive index characteristic or dispersion characteristic) is measured in advance, and stored a memory. Use of the conversion characteristic together with conversion characteristic information received from the partner station makes it possible to set the frequency of the excitation light to the optimum frequency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system comprising:

a first optical transmission apparatus including a first wavelength converter; and a second optical transmission apparatus including a second wavelength converter, the second optical transmission apparatus being coupled to the first optical transmission apparatus via an optical transmission line, wherein the first optical transmission apparatus has first information on a wavelength conversion characteristic of the first wavelength converter, and the second optical transmission apparatus has second information on a wavelength conversion characteristic of the second wavelength converter, wherein the first optical transmission apparatus notifies the second optical transmission apparatus of the first information, and wherein the second optical transmission apparatus sets, based on the first information and the second information, a second excitation light frequency at which a gain deviation of main signal light between the first optical transmission apparatus and the second optical transmission apparatus is minimized in the second wavelength converter.

2. The optical transmission system according to claim 1, wherein the second optical transmission apparatus notifies the first optical transmission apparatus of the second information, and wherein the first optical transmission apparatus sets, based on the second information and the first information, a first excitation light frequency at which the gain deviation of the main signal light between the first optical transmission apparatus and the second optical transmission apparatus is minimized in the first wavelength converter.

3. The optical transmission system according to claim 2, wherein the first excitation light frequency equals the second excitation light frequency.

4. The optical transmission system according to claim 2, wherein the second optical transmission apparatus sets an allowable difference between the first excitation light frequency and the second excitation light frequency, the allowable difference being within a range in which the second optical transmission apparatus is capable of receiving main signal light, to determine the second excitation light frequency within a range of the allowable difference.

5. The optical transmission system according to claim 1, wherein the first information and the second information are transmitted and received between the first optical transmission apparatus and the second optical transmission apparatus using an optical supervisory channel.

6. The optical transmission system according to claim 1, wherein the first optical transmission apparatus and the second optical transmission apparatus exchanges the first information and the second information through a supervisory control network.

* * * * *